US006915255B2

(12) United States Patent
Watanabe

(10) Patent No.: US 6,915,255 B2
(45) Date of Patent: Jul. 5, 2005

(54) APPARATUS, METHOD, AND COMPUTER PROGRAM PRODUCT FOR ENCODING AUDIO SIGNAL

(75) Inventor: Yasuhito Watanabe, Kanagawa-ken (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 741 days.

(21) Appl. No.: 10/036,718

(22) Filed: Dec. 21, 2001

(65) Prior Publication Data

US 2002/0116179 A1 Aug. 22, 2002

(30) Foreign Application Priority Data

Dec. 25, 2000 (JP) ....................................... 2000-391855

(51) Int. Cl.[7] ......................... G10L 19/00; G10L 21/00; H04B 1/66

(52) U.S. Cl. .................................... 704/200.1; 704/501

(58) Field of Search ............................. 704/200, 200.1, 704/500, 501, 504; 375/240, 241

(56) References Cited

U.S. PATENT DOCUMENTS 5,588,024 A * 12/1996 Takano ........................ 375/242
5,649,053 A 7/1997 Kim
5,764,698 A * 6/1998 Sudharsanan et al. ....... 375/241
6,308,150 B1 * 10/2001 Neo et al. ................ 704/200.1
6,393,393 B1 * 5/2002 Kawahara ................... 704/229
6,424,936 B1 * 7/2002 Shen et al. .............. 704/200.1
6,456,968 B1 * 9/2002 Taniguchi et al. .......... 704/229
6,577,252 B2 * 6/2003 Hotta .......................... 341/50
6,625,574 B1 * 9/2003 Taniguchi et al. .......... 704/229
6,678,468 B2 * 1/2004 Tatsumi et al. ............. 386/111
6,678,653 B1 * 1/2004 Tsushima et al. ........... 704/220
6,693,963 B1 * 2/2004 Taniguchi .............. 375/240.11
6,697,775 B2 * 2/2004 Kawahara ................... 704/229

FOREIGN PATENT DOCUMENTS

EP 0 918 401 5/1999

OTHER PUBLICATIONS

Bosi M. et al: "ISO/IEC MPEG–2 Advanced Audio Coding" Journal of the Audio Engineering society, Audio Engineering Society. New York, US, vol. 45, No. 10, Oct. 1, 1997, pp. 789–812, XP000730161, ISSN: 0004–7554. Abstract, p. 800, paragraph 5.5—p. 801, paragraph 5.5.2; figures 10, 11.

* cited by examiner

*Primary Examiner*—Martin Lerner
(74) *Attorney, Agent, or Firm*—Pearne & Gordon LLP

(57) ABSTRACT

Herein disclosed is an audio signal encoding apparatus comprises initial maximum scale factor band calculation means for calculating an initial maximum scale factor band for an audio signal inputted therein on the basis of the result made by the frame length determining means and the coded mode information inputted from the coded mode information means with reference to the initial maximum scale factor band information and Signal-to-Mask ratio threshold value information stored in the maximum scale factor band table storage means, and maximum scale factor band calculation means for calculating a maximum scale factor band for the audio signal on the basis of the initial maximum scale factor band calculated by the initial maximum scale factor band calculation means in accordance with the Signal-to-Mask ratio information calculated by the psychoacoustic model analyzing means, thereby making it possible to adaptively calculate the maximum scale factor band for the audio signal in accordance with the coded mode information such as bit rates and sampling frequencies.

18 Claims, 19 Drawing Sheets

F I G. 4

410

(a)

| Frequency / Bit Rate | 48000 | 44100 | 32000 | 24000 | 22050 | 16000 | 12000 | 11025 | 8000 |
|---|---|---|---|---|---|---|---|---|---|
| 128000 | 49 | 49 | 51 | 47 | 47 | 43 | 43 | 43 | 40 |
| 96000 | 43 | 44 | 48 | 47 | 47 | 43 | 43 | 43 | 40 |
| 80000 | 44 | 43 | 47 | 47 | 47 | 43 | 43 | 43 | 40 |
| 64000 | 37 | 38 | 40 | 45 | 47 | 43 | 43 | 43 | 40 |

(b)

| Frequency / Bit Rate | 48000 | 44100 | 32000 | 24000 | 22050 | 16000 | 12000 | 11025 | 8000 |
|---|---|---|---|---|---|---|---|---|---|
| 128000 | 13 | 14 | 14 | 15 | 15 | 15 | 15 | 15 | 15 |
| 96000 | 11 | 13 | 13 | 15 | 15 | 15 | 15 | 15 | 15 |
| 80000 | 10 | 12 | 12 | 15 | 15 | 15 | 15 | 15 | 15 |
| 64000 | 9 | 11 | 11 | 15 | 15 | 15 | 15 | 15 | 15 |

FIG. 5

410

(a)

| Bit Rate \ Frequency | 48000 | 44100 | 32000 | 24000 | 22050 | 16000 | 12000 | 11025 | 8000 |
|---|---|---|---|---|---|---|---|---|---|
| 128000 | 49 | 49 | 51 | 47 | 47 | 43 | 43 | 43 | 40 |
| 96000 | 45 | 45 | 51 | 47 | 47 | 43 | 43 | 43 | 40 |
| 80000 | 44 | 44 | 51 | 47 | 47 | 43 | 43 | 43 | 40 |
| 64000 | 39 | 38 | 40 | 45 | 47 | 43 | 43 | 43 | 40 |

(b)

| Bit Rate \ Frequency | 48000 | 44100 | 32000 | 24000 | 22050 | 16000 | 12000 | 11025 | 8000 |
|---|---|---|---|---|---|---|---|---|---|
| 128000 | 13 | 14 | 14 | 15 | 15 | 15 | 15 | 15 | 15 |
| 96000 | 12 | 13 | 14 | 15 | 15 | 15 | 15 | 15 | 15 |
| 80000 | 11 | 12 | 14 | 15 | 15 | 15 | 15 | 15 | 15 |
| 64000 | 10 | 11 | 13 | 15 | 15 | 15 | 15 | 15 | 15 |

FIG. 6

420

(a)

| Bit Rate \ Frequency | 48000 | 44100 | 32000 | 24000 | 22050 | 16000 | 12000 | 11025 | 8000 |
|---|---|---|---|---|---|---|---|---|---|
| 128000 | 0.1 | 0.1 | 0.1 | 0.1 | 0.05 | 0.05 | 0.05 | 0.05 | 0.05 |
| 96000 | 0.1 | 0.1 | 0.1 | 0.1 | 0.1 | 0.1 | 0.1 | 0.1 | 0.1 |
| 80000 | 0.1 | 0.1 | 0.1 | 0.1 | 0.1 | 0.1 | 0.1 | 0.1 | 0.1 |
| 64000 | 0.5 | 0.5 | 0.5 | 0.5 | 0.5 | 0.5 | 0.5 | 0.5 | 0.5 |

(b)

| Bit Rate \ Frequency | 48000 | 44100 | 32000 | 24000 | 22050 | 16000 | 12000 | 11025 | 8000 |
|---|---|---|---|---|---|---|---|---|---|
| 128000 | 1.0 | 1.0 | 1.0 | 0.1 | 0.1 | 0.1 | 0.1 | 0.1 | 0.1 |
| 96000 | 1.0 | 1.0 | 1.0 | 1.0 | 1.0 | 0.1 | 0.1 | 0.1 | 0.1 |
| 80000 | 1.0 | 1.0 | 1.0 | 1.0 | 1.0 | 0.1 | 0.1 | 0.1 | 0.1 |
| 64000 | 1.0 | 1.0 | 1.0 | 1.0 | 1.0 | 1.0 | 0.1 | 0.1 | 0.1 |

F I G. 7

420

(a)

| Bit Rate \ Frequency | 48000 | 44100 | 32000 | 24000 | 22050 | 16000 | 12000 | 11025 | 8000 |
|---|---|---|---|---|---|---|---|---|---|
| 128000 | 0.1 | 0.1 | 0.1 | 0.05 | 0.05 | 0.05 | 0.05 | 0.05 | 0.05 |
| 96000 | 0.1 | 0.1 | 0.1 | 0.1 | 0.1 | 0.05 | 0.05 | 0.05 | 0.05 |
| 80000 | 0.1 | 0.1 | 0.1 | 0.1 | 0.1 | 0.1 | 0.1 | 0.1 | 0.1 |
| 64000 | 0.5 | 0.5 | 0.5 | 0.5 | 0.5 | 0.5 | 0.1 | 0.1 | 0.1 |

(b)

| Bit Rate \ Frequency | 48000 | 44100 | 32000 | 24000 | 22050 | 16000 | 12000 | 11025 | 8000 |
|---|---|---|---|---|---|---|---|---|---|
| 128000 | 1.0 | 1.0 | 0.1 | 0.1 | 0.1 | 0.1 | 0.1 | 0.1 | 0.1 |
| 96000 | 1.0 | 1.0 | 1.0 | 0.1 | 0.1 | 0.1 | 0.1 | 0.1 | 0.1 |
| 80000 | 1.0 | 1.0 | 1.0 | 0.1 | 0.1 | 0.1 | 0.1 | 0.1 | 0.1 |
| 64000 | 1.0 | 1.0 | 1.0 | 1.0 | 1.0 | 1.0 | 0.1 | 0.1 | 0.1 |

F I G. 1 1

420E (a)

| Bit Rate \ Frequency | 48000 | 44100 | 32000 | 24000 | 22050 | 16000 | 12000 | 11025 | 8000 |
|---|---|---|---|---|---|---|---|---|---|
| 128000 | 100000 | 100000 | 100000 | 100000 | 50000 | 50000 | 50000 | 50000 | 50000 |
| 96000 | 100000 | 100000 | 100000 | 100000 | 100000 | 100000 | 100000 | 100000 | 100000 |
| 80000 | 100000 | 100000 | 100000 | 100000 | 100000 | 100000 | 100000 | 100000 | 100000 |
| 64000 | 500000 | 500000 | 500000 | 500000 | 500000 | 500000 | 500000 | 500000 | 500000 |

(b)

| Bit Rate \ Frequency | 48000 | 44100 | 32000 | 24000 | 22050 | 16000 | 12000 | 11025 | 8000 |
|---|---|---|---|---|---|---|---|---|---|
| 128000 | 1000000 | 1000000 | 1000000 | 100000 | 100000 | 100000 | 100000 | 100000 | 100000 |
| 96000 | 1000000 | 1000000 | 1000000 | 1000000 | 1000000 | 100000 | 100000 | 100000 | 100000 |
| 80000 | 1000000 | 1000000 | 1000000 | 1000000 | 1000000 | 100000 | 100000 | 100000 | 100000 |
| 64000 | 1000000 | 1000000 | 1000000 | 1000000 | 1000000 | 1000000 | 100000 | 100000 | 100000 |

F I G. 1 2

(a)

420E

| Bit Rate \ Frequency | 48000 | 44100 | 32000 | 24000 | 22050 | 16000 | 12000 | 11025 | 8000 |
|---|---|---|---|---|---|---|---|---|---|
| 128000 | 100000 | 100000 | 100000 | 50000 | 50000 | 50000 | 50000 | 50000 | 50000 |
| 96000 | 100000 | 100000 | 100000 | 100000 | 100000 | 50000 | 50000 | 50000 | 50000 |
| 80000 | 100000 | 100000 | 100000 | 100000 | 100000 | 100000 | 100000 | 100000 | 100000 |
| 64000 | 500000 | 500000 | 500000 | 500000 | 500000 | 500000 | 100000 | 100000 | 100000 |

(b)

| Bit Rate \ Frequency | 48000 | 44100 | 32000 | 24000 | 22050 | 16000 | 12000 | 11025 | 8000 |
|---|---|---|---|---|---|---|---|---|---|
| 128000 | 1000000 | 1000000 | 100000 | 100000 | 100000 | 100000 | 100000 | 100000 | 100000 |
| 96000 | 1000000 | 1000000 | 1000000 | 100000 | 100000 | 100000 | 100000 | 100000 | 100000 |
| 80000 | 1000000 | 1000000 | 1000000 | 100000 | 100000 | 100000 | 100000 | 100000 | 100000 |
| 64000 | 1000000 | 1000000 | 1000000 | 1000000 | 1000000 | 1000000 | 100000 | 100000 | 100000 |

FIG. 18
PRIOR ART

| Frequency | 96000 | 88200 | 64000 | 48000 | 44100 | 32000 | 24000 | 22050 | 16000 | 12000 | 11025 | 8000 |
|---|---|---|---|---|---|---|---|---|---|---|---|---|
| maxSfb (LONG) | 49 | 49 | 47 | 48 | 49 | 51 | 47 | 47 | 43 | 43 | 43 | 40 |
| maxSfb (SHORT) | 12 | 12 | 12 | 13 | 14 | 13 | 15 | 15 | 15 | 15 | 15 | 15 |

APPARATUS, METHOD, AND COMPUTER PROGRAM PRODUCT FOR ENCODING AUDIO SIGNAL

BACKGROUND OF THE INVENTION

1. Field of the Invention

The present invention relates to an apparatus, method, and computer program product for encoding an audio signal, and more particularly, to an apparatus, method, and computer program product for encoding an audio signal by means of time-frequency transform in accordance with the Moving Picture Experts Group audio standard.

2. Description of the Related Art

There have so far been proposed a wide variety of audio signal encoding methods such as an entropy encoding method for encoding an audio signal in accordance with statistics related to the audio signal to be compressed, and a perceptual encoding method for encoding an audio signal in accordance with human perceptual characteristics. The MPEG audio standard aggressively adopts the perceptual encoding method, which, for example, performs compression to remove audio signal components not audible by the human ear due to the masking effect or below the minimum audible threshold.

Such an encoding method comprises the steps of (1) inputting an audio signal consisting of a plurality of audio signal components, and (2) assigning a predetermined value to each of the audio signal components in accordance with the sampling frequency or frame length (long-length frame or short-length frame). An audio signal encoding method, for example, conforming to MPEG-2 Advanced Audio Coding (AAC) further comprises the step of assigning a predetermined value to each of the audio signal components in accordance with a scale factor band table shown in FIG. 18. The scale factor band table shown in FIG. 18 includes a plurality of maximum scale factor bands to be allocated to respective frequencies, i.e., audio signal components of the audio signal with respect to a short-length frame and a long-length frame.

One of the conventional audio signal encoding apparatus is shown in FIG. 19 as comprising inputting means a3, FFT analyzing means 300, Psychoacoustic model analyzing means 330, frame length determining means 310, coded mode information inputting means 320, maximum scale factor band calculation means 340, maximum scale factor band table storage means 350, spectral processing means 360, and quantizing and encoding means 370. In the drawings, "maxSfb" is intended to mean "maximum scale factor band", "smr" is intended to mean "Signal-to-Mask ratio".

The inputting means a3 is operative to input the audio signal therein. The FFT analyzing means 300 is operative to perform the fast Fourier transform to the audio signal inputted from the inputting means a3 to generate frequency information about the audio signal. The frame length determining means 310 is operative to judge whether the audio signal inputted from the inputting means a3 is transient or stationary. This means that the frame length determining means 310 is operative to determine a short-length frame for the audio signal when it is judged that the audio signal is transient and a long-length frame for the audio signal when it is judged that the audio signal is stationary.

The coded mode information inputting means 320 is operative to input coded mode information. The psychoacoustic model analyzing means 330 is operative to calculate Signal-to-Mask ratio information for the audio signal on the basis of the frequency information about the audio signal generated by the FFT analyzing means 300, in accordance with a predetermined psychoacoustic model. The maximum scale factor band table storage means 350 is operative to store initial maximum scale factor band information. The initial maximum scale factor band information includes a plurality of predetermined maximum scale factor bands each fixedly corresponding to the coded mode information such as a bit rate and a sampling frequency and the frame length in one-to-one relationship.

The maximum scale factor band calculation means 340 is operative to calculate a maximum scale factor band for the audio signal on the basis of the result made by the frame length determining means 310 and the coded mode information inputted from the coded mode information means 320 with reference to the initial maximum scale factor band information stored in the maximum scale factor band table storage means 350.

The spectral processing means 360 is operative to divide the audio signal inputted from the inputting means a3 into a plurality of audio signal components each corresponding to a scale factor band, and to perform spectral processing to the audio signal components up to an audio signal component corresponding to the maximum scale factor band calculated by the maximum scale factor band calculation means 340, on the basis of the Signal-to-Mask ratio information calculated by the psychoacoustic model analyzing means 330 to generate audio signal data. The spectral processing performed by the spectral processing means 360 includes Modified Discrete Cosine Transform (hereinlater referred to as "MDCT") processing and Temporal Noise Shaping (hereinlater referred to as "TNS") processing. The quantizing and encoding means 370 is operative to quantize and encode the audio signal data generated by the spectral processing means 340 to generate a coded audio signal to be outputted therethrough.

In the above conventional audio signal encoding apparatus, the maximum scale factor band calculation means 340 calculates a maximum scale factor band by selecting a maximum scale factor band for the audio signal from among the fixedly predetermined maximum scale factor bands stored in the maximum scale factor band table storage means 350 on the basis of the frame length and the coded mode information about the audio signal. The initial maximum scale factor band information includes a plurality of predetermined maximum scale factor bands each fixedly corresponding to the coded mode information such as a bit rate and a sampling frequency and the frame length in one-to-one relationship while, on the other hand, audio signals inputted therein are different one after another. This means that the maximum scale factor band calculation means 340 calculates a maximum scale factor band on the basis of the coded mode information such as the frame length and the coded mode information regardless of the characteristics of the audio signal, for example, whether the audio signal is biased to any frequency range or not. The spectral processing means 360 and the quantizing and encoding means 370, then, performs the spectral processing to, and quantize and encode the audio signal up to a audio signal component corresponding to the maximum scale factor band thus calculated, regardless of whether the audio signal is biased to any frequency range or not.

As will be understood from the previously mentioned fact, the conventional audio signal encoding apparatus of this type encounters such a drawback that the conventional audio signal encoding apparatus may unnecessarily perform the spectral processing to, and quantize and encode all the audio signal components of the audio signal including audio signal components not audible by the human ear especially when the audio signal is biased to, for example, a low-frequency range, thereby making it difficult to efficiently perform the spectral processing to, and quantize and encode the audio signal and enhance the quality of the audio signal.

The present invention is made with a view to overcoming the previously mentioned drawback inherent to the conventional audio signal encoding apparatus.

SUMMARY OF THE INVENTION

It is, therefore, an object of the present invention to provide an audio signal encoding apparatus, method, and computer program product for dividing an audio signal into a plurality of audio signal components each corresponding to a scale factor band, calculating a maximum scale factor band for the audio signal in accordance with a predetermined psychoacoustic model, and performing spectral processing to, quantizing and encoding the audio signal components up to the audio signal component corresponding to the maximum scale factor band.

It is another object of the present invention to provide an audio signal encoding apparatus, method, and computer program product capable of adaptively calculating the maximum scale factor band for the audio signal in accordance to the characteristics of the audio signal.

In accordance with a first aspect of the present invention, there is provided an audio signal encoding apparatus for dividing audio signal into a plurality of audio signal components each corresponding to a scale factor band to be encoded in accordance with a predetermined psychoacoustic model, comprising: inputting means for inputting the audio signal therein; frame length determining means for judging whether the audio signal inputted from the inputting means is transient or stationary, and determining a short-length frame for the audio signal when it is judged that the audio signal is transient and a long-length frame for the audio signal when it is judged that the audio signal is stationary; FFT analyzing means for performing the fast Fourier transform to the audio signal inputted from the inputting means to generate frequency information about the audio signal; coded mode information inputting means for inputting coded mode information; psychoacoustic model analyzing means for calculating Signal-to-Mask ratio information for the audio signal on the basis of the frequency information about the audio signal generated by the FFT analyzing means, in accordance with the predetermined psychoacoustic model; maximum scale factor band table storage means for storing initial maximum scale factor band information and Signal-to-Mask ratio threshold value information; initial maximum scale factor band calculation means for calculating an initial maximum scale factor band for the audio signal on the basis of the result made by the frame length determining means and the coded mode information inputted from the coded mode information means with reference to the initial maximum scale factor band information and the Signal-to-Mask ratio threshold value information stored in the maximum scale factor band table storage means; maximum scale factor band calculation means for calculating a maximum scale factor band for the audio signal on the basis of the initial maximum scale factor band calculated by the initial maximum scale factor band calculation means in accordance with the Signal-to-Mask ratio information calculated by the psychoacoustic model analyzing means; spectral processing means for dividing the audio signal inputted from the inputting means into a plurality of audio signal components each corresponding to a scale factor band, and performing spectral processing to the audio signal components up to an audio signal component corresponding to the maximum scale factor band calculated by the maximum scale factor band calculation means, on the basis of the Signal-to-Mask ratio information calculated by the psychoacoustic model analyzing means to generate audio signal data; and quantizing and encoding means for quantizing and encoding the audio signal data generated by the spectral processing means to generate a coded audio signal to be outputted therethrough whereby the maximum scale factor band calculation means is operative to adaptively calculate the maximum scale factor band in response to the audio signal inputted therein.

In the above audio signal encoding apparatus, the coded mode information may include bit rate information and sampling frequency information. The maximum scale factor band table storage means may be operative to store initial maximum scale factor band information having a plurality of scale factor bands in relation to the bit rate information and the sampling frequency information and Signal-to-Mask ratio threshold value information having a plurality of Signal-to-Mask ratio threshold values in relation to the bit rate information and the sampling frequency information. The initial maximum scale factor band calculation means may be operative to calculate an initial maximum scale factor band for the audio signal on the basis of the result made by the frame length determining means and the coded mode information including the bit rate information and the sampling frequency information inputted from the coded mode information means with reference to the initial maximum scale factor band information and Signal-to-Mask ratio threshold value information stored in the maximum scale factor band table storage means. The maximum scale factor band calculation means may be operative to calculate a maximum scale factor band for the audio signal on the basis of the Signal-to-Mask ratio information calculated by the psychoacoustic model analyzing means and the initial maximum scale factor band calculated by the initial maximum scale factor band calculation means.

In the above audio signal encoding apparatus, the coded mode information further may include the number of channels. The maximum scale factor band table storage means may be operative to store initial maximum scale factor band information having a plurality of scale factor bands in relation to the number of channels and Signal-to-Mask ratio threshold value information having a plurality of Signal-to-Mask ratio threshold values in relation to the number of channels. The initial maximum scale factor band calculation means may be operative to calculate an initial maximum scale factor band for the audio signal on the basis of the result made by the frame length determining means and the coded mode information including the number of channels inputted from the coded mode information means with reference to the initial maximum scale factor band information and Signal-to-Mask ratio threshold value information stored in the maximum scale factor band table storage means. The maximum scale factor band calculation means may be operative to calculate a maximum scale factor band for the audio signal on the basis of the Signal-to-Mask ratio information calculated by the psychoacoustic model analyzing means and the initial maximum scale factor band calculated by the initial maximum scale factor band calculation means.

In the above audio signal encoding apparatus, the Signal-to-Mask ratio information may include a Signal-to-Mask ratio table showing a relationship between a plurality of Signal-to-Mask ratios and scale factor bands. The maximum scale factor band table storage means may be operative to store initial maximum scale factor band information and Signal-to-Mask ratio threshold value information. The initial maximum scale factor band calculation means may be operative to calculate an initial maximum scale factor band and a Signal-to-Mask ratio threshold value for the audio signal on the basis of the result made by the frame length determining means and the coded mode information inputted from the coded mode information means with reference to the initial maximum scale factor band information and the Signal-to-Mask ratio threshold value information stored in the maximum scale factor band table storage means. The maximum scale factor band calculation means may be operative to calculate a maximum scale factor band for the audio signal on the basis of the initial maximum scale factor band and the Signal-to-Mask ratio threshold value calculated by the initial maximum scale factor band calculation means in accordance with the Signal-to-Mask ratio table showing a relationship between Signal-to-Mask ratios and scale factor bands included in the Signal-to-Mask ratio information calculated by the psychoacoustic model analyzing means through the steps of: (1) determining a Signal-to-Mask ratio corresponding to a maximum scale factor band for the audio signal in accordance with the Signal-to-Mask ratio table wherein the initial value of the maximum scale factor band is the initial maximum scale factor band calculated by the initial maximum scale factor band calculation means; (2) judging whether the Signal-to-Mask ratio determined in the step (1) is greater than the Signal-to-Mask ratio threshold value; (2-1) decrementing the maximum scale factor band by one and returning to the step (1) if it is judged that the Signal-to-Mask ratio is not greater than the Signal-to-Mask ratio threshold value in the step (2); (3) repeating the step (1) to step (2-1) until it is judged that the Signal-to-Mask ratio is greater than the Signal-to-Mask ratio threshold value in the step (2); (4) incrementing the maximum scale factor band by one if it is judged that the Signal-to-Mask ratio is greater than the Signal-to-Mask ratio threshold value in the step (2); and (5) outputting the maximum scale factor band thus incremented by one in the step (4) to the spectral processing means.

BRIEF DESCRIPTION OF THE DRAWINGS

The features and advantages of the apparatus, method, and computer program product for encoding audio signal according to the present invention will be more clearly understood from the following description taken in conjunction with the accompanying drawings in which:

FIGS. 4A and 4B are tables explaining the initial maximum scale factor band information shown in FIG. 2;

FIGS. 5A and 5B are tables explaining the initial maximum scale factor band information shown in FIG. 2;

FIGS. 6A and 6B are tables explaining the Signal-to-Mask ratio threshold value information shown in FIG. 2;

FIGS. 7A and 7B are tables explaining the Signal-to-Mask ratio threshold value information shown in FIG. 2;

FIGS. 11A and 11B are tables explaining an energy threshold value information stored in maximum scale factor band table storage means forming part of the audio signal encoding apparatus shown in FIG. 9;

FIGS. 12A and 12B are tables explaining the energy threshold value information stored in maximum scale factor band table storage means forming part of the audio signal encoding apparatus shown in FIG. 9;

FIG. 18 is a scale factor band table including a plurality of maximum scale factor band table to be allocated to respective frequencies used in a conventional audio signal encoding process.

DESCRIPTION OF THE PREFERRED EMBODIMENTS

The following description will be directed to a plurality of preferred embodiments of the audio signal encoding apparatus according to the present invention.

Figure 1:
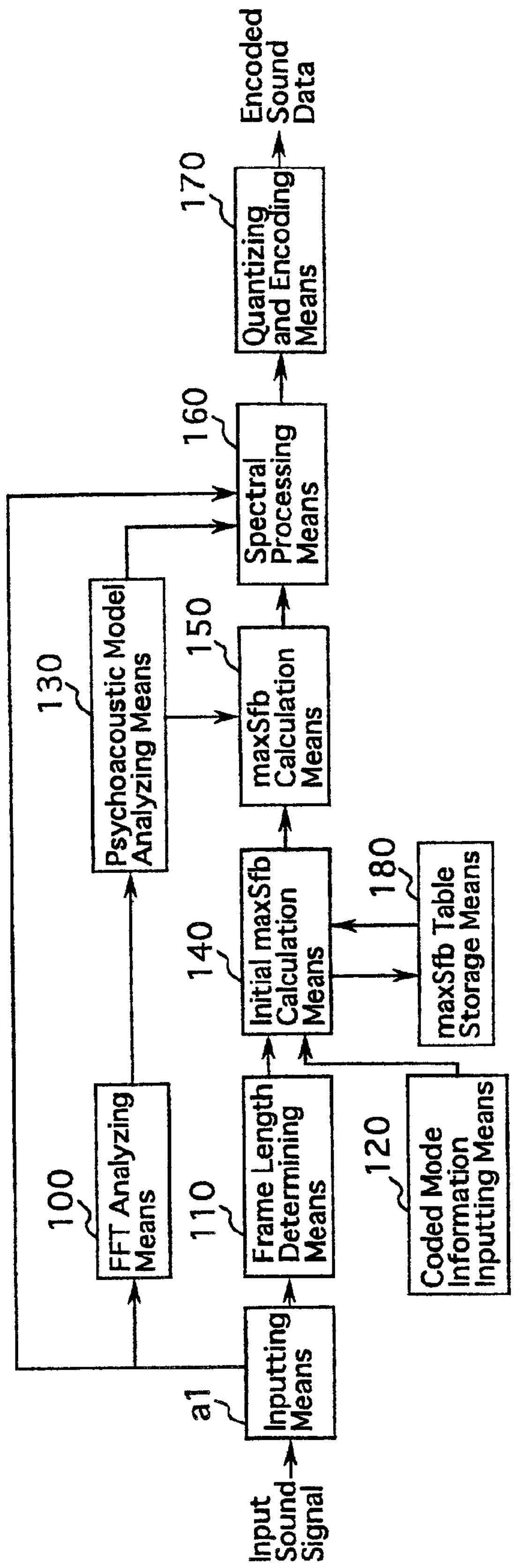
FIG. 1 is a schematic diagram of a first embodiment of the audio signal encoding apparatus according to the present invention.

Referring now to the drawings, in particular, to FIGS. 1 to 8, there is shown a first preferred embodiment of the audio signal encoding apparatus according to the present invention. The first embodiment of the audio signal encoding apparatus is shown in FIG. 1 as comprising inputting means a1, FFT analyzing means 100, frame length determining means 110, coded mode information inputting means 120, psychoacoustic model analyzing means 130, initial maximum scale factor band calculation means 140, maximum scale factor band calculation means 150, spectral processing means 160, quantizing and encoding means 170, and maximum scale factor band table storage means 180.

The inputting means a1 is adapted to input the audio signal therein. The FFT analyzing means 100 is adapted to perform the fast Fourier transform, hereinlater referred to as "FFT analysis", to the audio signal inputted from the inputting means a1 to generate frequency information about the audio signal. The frame length determining means 110 is designed to determine an appropriate frame length for the audio signal. This means that the frame length determining means 110 is adapted to judge whether the audio signal inputted from the inputting means a1 is transient or stationary, and determine a short-length frame for the audio signal when it is judged that the audio signal is transient and a long-length frame for the audio signal when it is judged that the audio signal is stationary.

The coded mode information inputting means 120 is designed to be used by an operator to input coded mode information therethrough. This means that the coded mode information inputting means 120 is adapted to input coded mode information such as, for example, a sampling frequency and a bit rate of the audio signal.

Figure 2:
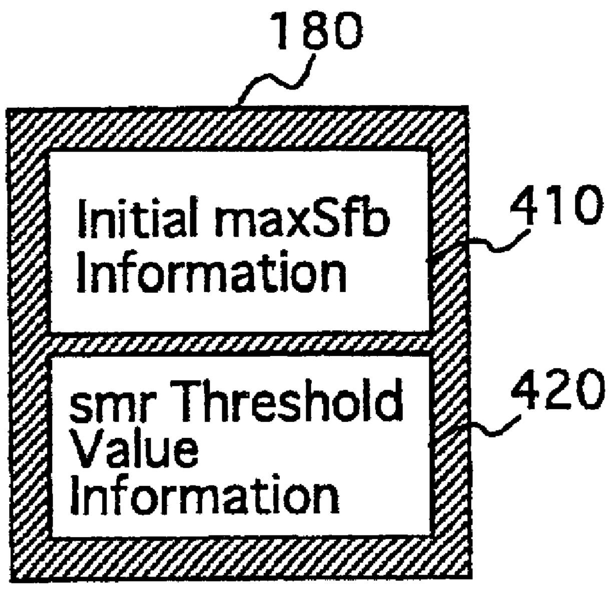
FIG. 2 is a schematic diagram explaining initial maximum scale factor band information and Signal-to-Mask ratio threshold value information stored in maximum scale factor band table storage means forming part of the audio signal encoding apparatus shown in FIG. 1.

The psychoacoustic model analyzing means 130 is adapted to input the frequency information about the audio signal generated by the FFT analyzing means 100 and calculate Signal-to-Mask ratio information for the audio signal, which will be described later, on the basis of the frequency information thus inputted, in accordance with a known, predetermined psychoacoustic model. The maximum scale factor band table storage means 180 is adapted to store initial maximum scale factor band information 410 and Signal-to-Mask ratio threshold value information 420 as shown in FIG. 2. In the drawings, "smr" is intended to mean "Signal-to-Mask ratio".

The initial maximum scale factor band calculation means 140 is adapted to calculate an initial maximum scale factor band for the audio signal on the basis of the result made by the frame length determining means 110 and the coded mode information inputted from the coded mode information means 120 with reference to the initial maximum scale factor band information 410 and Signal-to-Mask ratio threshold value information 420 stored in the maximum scale factor band table storage means 180.

The maximum scale factor band calculation means 150 is adapted to calculate a maximum scale factor band for the audio signal on the basis of the initial maximum scale factor band calculated by the initial maximum scale factor band calculation means 140 in accordance with the Signal-to-Mask ratio information calculated by the psychoacoustic model analyzing means 130.

The spectral processing means 160 is adapted to divide the audio signal inputted from the inputting means a1 into a plurality of audio signal components each corresponding to a scale factor band, and to perform spectral processing such as MDCT and TNS to the audio signal components up to an audio signal component corresponding to the maximum scale factor band calculated by the maximum scale factor band calculation means 150, on the basis of the Signal-to-Mask ratio information calculated by the psychoacoustic model analyzing means 130 to generate audio signal data.

The quantizing and encoding means 170 is adapted to quantize and encode the audio signal data generated by the spectral processing means 160 to generate a coded audio signal to be outputted therethrough.

As will be understood from the foregoing description, it is to be understood that the first embodiment of the audio signal encoding apparatus thus constructed, the maximum scale factor band calculation means 150 is operative to adaptively calculate the maximum scale factor band for the audio signal in accordance to the characteristics, i.e., the Signal-to-Mask ratio information of the audio signal inputted therein.

According to the present invention, all the functions of the first embodiment of the audio signal encoding apparatus may be performed by a personal computer comprising a central processing unit, hereinlater referred to as a "CPU", a sound device such as a sound card, and computer usable storage medium such as a floppy disk, a CD-ROM, a DVD-ROM, a hard disk, and so on, having computer readable code embodied therein for executing all of the functions of the aforesaid constituent elements of the first embodiment of the audio signal encoding apparatus.

Furthermore, the first embodiment of the audio signal encoding apparatus may be applied to music distribution service required to encode a sound signal of high quality or in complex encoding mode.

The operation of the first embodiment of the audio signal encoding apparatus will be described hereinafter.

The inputting means a1 is operated to input an audio signal therein. The frame length determining means 110 is operated to judge whether the audio signal inputted from the inputting means a1 is transient or stationary, and determine a short-length frame for the audio signal when it is judged that the audio signal is transient and a long-length frame for the audio signal when it is judged that the audio signal is stationary.

The FFT analyzing means 100 is operated to perform the FFT analysis to the audio signal inputted from the inputting means a1 to generate frequency information about the audio signal. The psychoacoustic model analyzing means 130 is operated to input the frequency information about the audio signal generated by the FFT analyzing means 100 and to calculate Signal-to-Mask ratio information for the audio signal on the basis of the frequency information thus inputted, in accordance with a known, predetermined psychoacoustic model. The Signal-to-Mask ratio information includes Signal-to-Mask ratio threshold value information showing a relationship between a plurality of Signal-to-Mask ratios and scale factor bands used to determine Signal-to-Mask ratios for respective scale factor bands.

The coded mode information inputting means 120 is operated to input coded mode information such as, for example, a sampling frequency and a bit rate of the audio signal therethrough in accordance with the operation of an operator. The maximum scale factor band table storage means 180 is operated to store initial maximum scale factor band information 410 and Signal-to-Mask ratio threshold value information 420.

The initial maximum scale factor band calculation means 140 is operated to calculate an initial maximum scale factor band and a Signal-to-Mask ratio threshold value for the audio signal on the basis of the result made by the frame length determining means 110 and the coded mode information inputted from the coded mode information means 120 with reference to the initial maximum scale factor band information 410 and the Signal-to-Mask ratio threshold value information 420 stored in the maximum scale factor band table storage means 180.

The maximum scale factor band calculation means 150 is then operated to calculate a maximum scale factor band for the audio signal on the basis of the initial maximum scale factor band, i.e., 42 and the Signal-to-Mask ratio threshold value, i.e., 1.0 thus calculated by the initial maximum scale factor band calculation means 140 in accordance with the Signal-to-Mask ratio threshold value information showing a relationship between Signal-to-Mask ratios and scale factor bands included in the Signal-to-Mask ratio information calculated by the psychoacoustic model analyzing means 130.

The spectral processing means 160 is operated to divide the audio signal inputted from the inputting means a1 into a plurality of audio signal components each corresponding to a scale factor band, and to perform spectral processing such as MDCT and TNS to the audio signal components up to an audio signal component corresponding to the maximum scale factor band calculated by the maximum scale factor band calculation means 150, on the basis of the Signal-to-Mask ratio information calculated by the psychoacoustic model analyzing means 130 to generate audio signal data.

The quantizing and encoding means 170 is operated to quantize and encode the audio signal data generated by the spectral processing means 160 to generate a coded audio signal to be outputted therethrough.

The first embodiment of the audio signal encoding apparatus performs a time-frequency transform type encoding method of calculating Signal-to-Mask ratios for respective scale factor bands. The encoding method according to the present invention, however, is not characterized in the fact that the audio signal encoding apparatus assigns weights to audio signal components corresponding to respective scale factor bands in accordance with the psychoacoustic model, but characterized in the fact that the audio signal encoding apparatus determines a maximum scale factor band, and performs spectral process and encoding process to the audio signal components up to an audio signal component corresponding to the maximum scale factor band.

Figure 3:
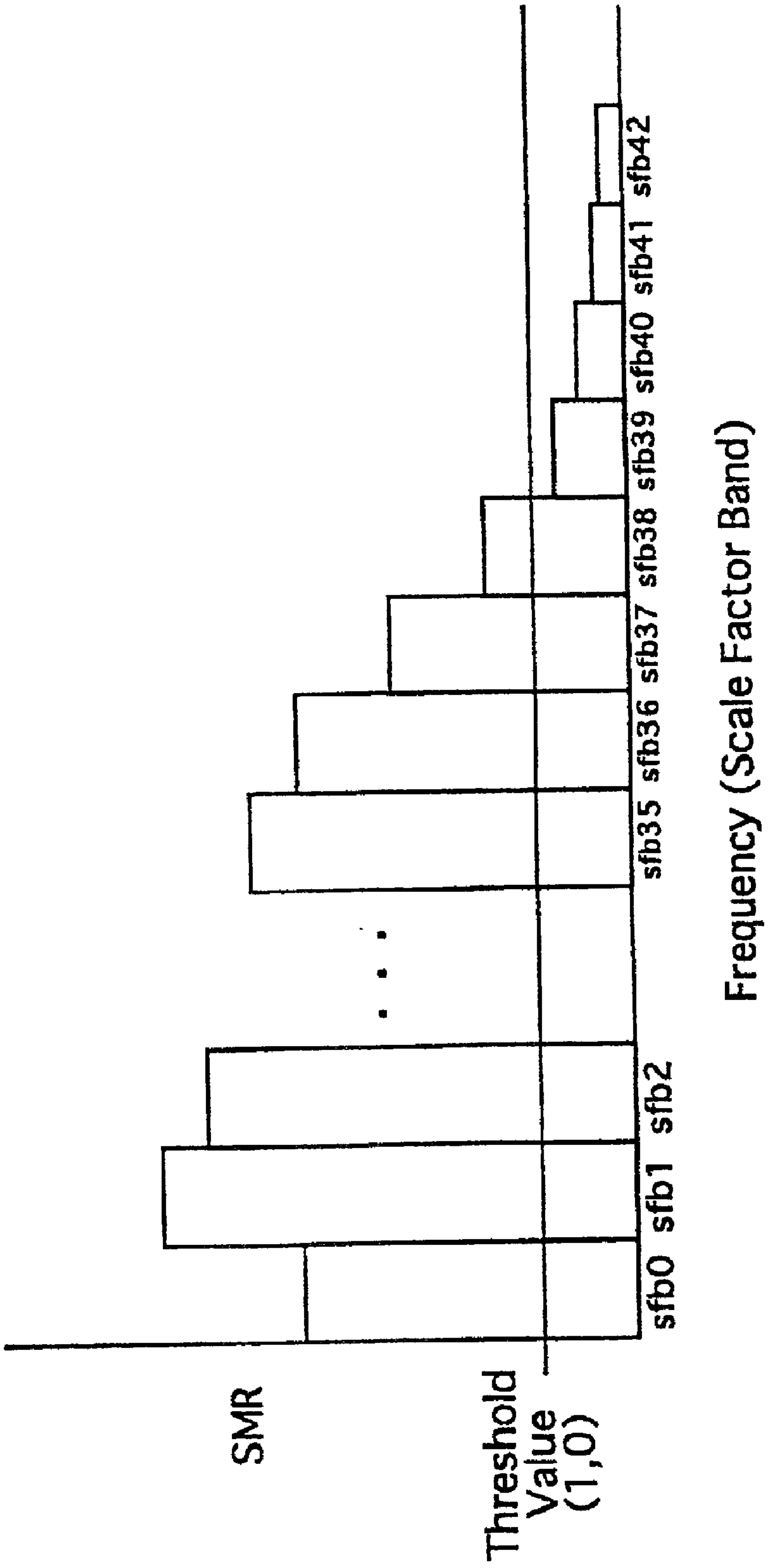
FIG. 3 is a pattern diagram explaining a maximum scale factor band calculation process performed by the audio signal encoding apparatus shown in FIG. 1.

In this example, the audio signal components are available from an audio signal component corresponding to a scale factor band "0" to an audio signal component corresponding to a scale factor band "42" as shown in FIG. 3. The first embodiment of the audio signal encoding apparatus is operated to perform spectral processing to, and quantize and encode the audio signal components up to an audio signal component corresponding to a maximum scale factor band, thereby making it possible to flexibly optimize the target frequency band to be processed and encoded, and reduce unnecessary processes.

Description is now be made on how the maximum scale factor band calculation means 150 is operated to calculate a maximum scale factor band for the audio signal with reference to the drawings of FIG. 3.

FIG. 3 is a graph showing a relationship between Signal-to-Mask ratios and scale factor bands calculated by the psychoacoustic model analyzing means 130, and a Signal-to-Mask threshold value calculated by the initial maximum scale factor band calculation means 140.

The maximum scale factor band calculation means 150 is operated to calculate a maximum scale factor band for the audio signal on the basis of the initial maximum scale factor band and the Signal-to-Mask ratio threshold value calculated by the initial maximum scale factor band calculation means 140 in accordance with the Signal-to-Mask ratio threshold value information showing a relationship between Signal-to-Mask ratios and scale factor bands included in the Signal-to-Mask ratio information calculated by the psychoacoustic model analyzing means 130 through the following steps (1) to (5). In this example, it is assumed that the initial maximum scale factor band calculation means 140 calculates the initial maximum scale factor band "42" and the Signal-to-Mask ratio threshold value "1.0" for the audio signal as shown in FIG. 3.

Step (1): The maximum scale factor band calculation means 150 is operated to determine a Signal-to-Mask ratio corresponding to a maximum scale factor band wherein the initial value of the maximum scale factor band is the initial maximum scale factor band calculated by the initial maximum scale factor band calculation means 140.

Step (2): The maximum scale factor band calculation means 150 is operated to judge whether the Signal-to-Mask ratio determined in the step (1) is greater than the Signal-to-Mask ratio threshold value.

Step (2-1): The maximum scale factor band calculation means 150 is operated to decrement the maximum scale factor band by one and to return to the step (1) if it is judged that the Signal-to-Mask ratio is not greater than the Signal-to-Mask ratio threshold value in the step (2).

Step (3): The maximum scale factor band calculation means 150 is operated to repeat the step (1) to step (2-1) until it is judged that the Signal-to-Mask ratio is greater than the Signal-to-Mask ratio threshold value in the step (2).

Step (4): The maximum scale factor band calculation means 150 is operated to increment the maximum scale factor band by one if it is judged that the Signal-to-Mask ratio is greater than the Signal-to-Mask ratio threshold value in the step (2).

In this example, the Signal-to-Mask ratio becomes greater than the Signal-to-mask ratio threshold value "1.0" when the maximum scale factor band is "38" as shown in FIG. 3. The maximum scale factor band calculation means 150 is operated to increment the maximum scale factor band "38" by one, resulting in the maximum scale factor band "39".

Step (5): The maximum scale factor band calculation means 150 is operated to output the maximum scale factor band thus incremented by one in the step (4) to the spectral processing means 160.

In this example, the maximum scale factor band calculation means 150 is operated to output the maximum scale factor band "39" to the spectral processing means 160.

The following description is directed to the initial maximum scale factor band information 410 and the Signal-to-Mask ratio threshold value information 420.

An example of the initial maximum scale factor band information 410 has a plurality of scale factor bands in relation to "bit rates" and "sampling frequencies" with respect to "the number of channels" and "the frame length", as shown in FIGS. 4 and 5. "The bit rates", "sampling frequencies", and "the number of channels" are inputted through the coded mode information inputting means 120. The initial maximum scale factor band information 410 shown in FIG. 4(*a*) has a plurality of scale factor bands in relation to bit rates and the sampling frequencies with respect to the number of channels "2 (stereophonic)" and long-length frame. The initial maximum scale factor band information 410 shown in FIG. 4(*b*) has a plurality of scale factor bands in relation to bit rates and the sampling frequencies with respect to the number of channels "2 (stereophonic)" and short-length frame. The initial maximum scale factor band information 410 shown in FIG. 5(*a*) has a plurality of scale factor bands in relation to bit rates and the sampling frequencies with respect to the number of channels "1 (monophonic)" and long-length frame. The initial maximum scale factor band information 410 shown in FIG. 5(*b*) has a plurality of scale factor bands in relation to bit rates and the sampling frequencies with respect to the number of channels "1 (monophonic)" and short-length frame.

The initial maximum scale factor band information 410 is created so that the audio signal components not audible by the human ear due to the masking effect or below the minimum audible threshold are hardly encoded. The audio signal components corresponding to high frequency bands are difficult to hear while, on the other hand, the audio signal components corresponding to low frequency bands are easy to hear.

In the initial maximum scale factor band information 410, the initial maximum scale factor band is lowered so that the audio signal components corresponding to high frequency bands are hardly encoded and the audio signal components corresponding to low frequency bands are predominantly encoded when, for example, "the bit rate" is lowered and the number of available bits is consequently decreased. The initial maximum scale factor band, on the other hand, is raised so that the audio signal components corresponding to high frequency bands are encoded to improve the quality of sound when, for example, "the sampling frequency" is lowered, and, consequently, the long-length frame is determined for the frame length and the number of available bits is increased.

Furthermore, the initial maximum scale factor band is raised so that the audio signal components corresponding to high frequency bands are encoded to improve the quality of sound when "the number of channels" is low, and the number of available bits per one frame is consequently decreased. The initial maximum scale factor band is also raised so that the audio signal components corresponding to high frequency bands are encoded to improve the quality of sound when the short-length frame is determined for the audio signal as "the frame length" since it is judged that the audio signal is transient, and the energy of the audio signal components corresponding to the high frequency band is consequently high.

An example of the Signal-to-Mask ratio threshold value information 420 has a plurality of Signal-to-Mask ratio threshold values in relation to "bit rates" and "sampling frequencies" with respect to "the number of channels" and "the frame length", as shown in FIGS. 6 and 7. The Signal-to-Mask ratio threshold value information 420 shown in FIG. 6(*a*) has a plurality of Signal-to-Mask ratio threshold values in relation to bit rates and the sampling frequencies with respect to the number of channels "2 (stereophonic)" and long-length frame. The Signal-to-Mask ratio threshold value information 420 shown in FIG. 6(*b*) has a plurality of Signal-to-Mask ratio threshold values in relation to bit rates and the sampling frequencies with respect to the number of channels "2 (stereophonic)" and short-length frame. The Signal-to-Mask ratio threshold value information 420 shown in FIG. 7(*a*) has a plurality of Signal-to-Mask ratio threshold values in relation to bit rates and the sampling frequencies with respect to the number of channels "1 (monophonic)" and long-length frame. The Signal-to-Mask ratio threshold value information 420 shown in FIG. 7(*b*) has a plurality of Signal-to-Mask ratio threshold values in relation to bit rates and the sampling frequencies with respect to the number of channels "1 (monophonic)" and short-length frame.

The Signal-to-Mask ratio threshold value information 420 is created so that the audio signal components not audible by the human ear due to the masking effect or below the minimum audible threshold are hardly encoded. The audio signal components corresponding to high frequency bands are difficult to hear while, on the other hand, the audio signal components corresponding to low frequency bands are easy to hear.

In the Signal-to-Mask ratio threshold value information 420, the initial maximum Signal-to-Mask ratio threshold value is raised so that the audio signal components corresponding to high frequency bands are hardly encoded and the audio signal components corresponding to low frequency bands are predominantly encoded when, for example, "the bit rate" is lowered and the number of available bits is consequently decreased. The initial maximum Signal-to-Mask ratio threshold value, on the other hand, is lowered so that the audio signal components corresponding to high frequency bands are encoded to improve the quality of sound when, for example, "the sampling frequency" is lowered, and, consequently, the long-length frame is determined for the frame length and the number of available bits is increased.

Furthermore, the initial maximum Signal-to-Mask ratio threshold value is lowered so that the audio signal components corresponding to high frequency bands are encoded to improve the quality of sound when "the number of channels" is low, and the number of available bits per one frame is consequently decreased. The initial maximum Signal-to-Mask ratio threshold value is also lowered so that the audio signal components corresponding to high frequency bands are encoded to improve the quality of sound when the short-length frame is determined for the audio signal as "the frame length" since it is judged that the audio signal is transient, and the energy of the audio signal components corresponding to the high frequency band is consequently high.

Figure 8:
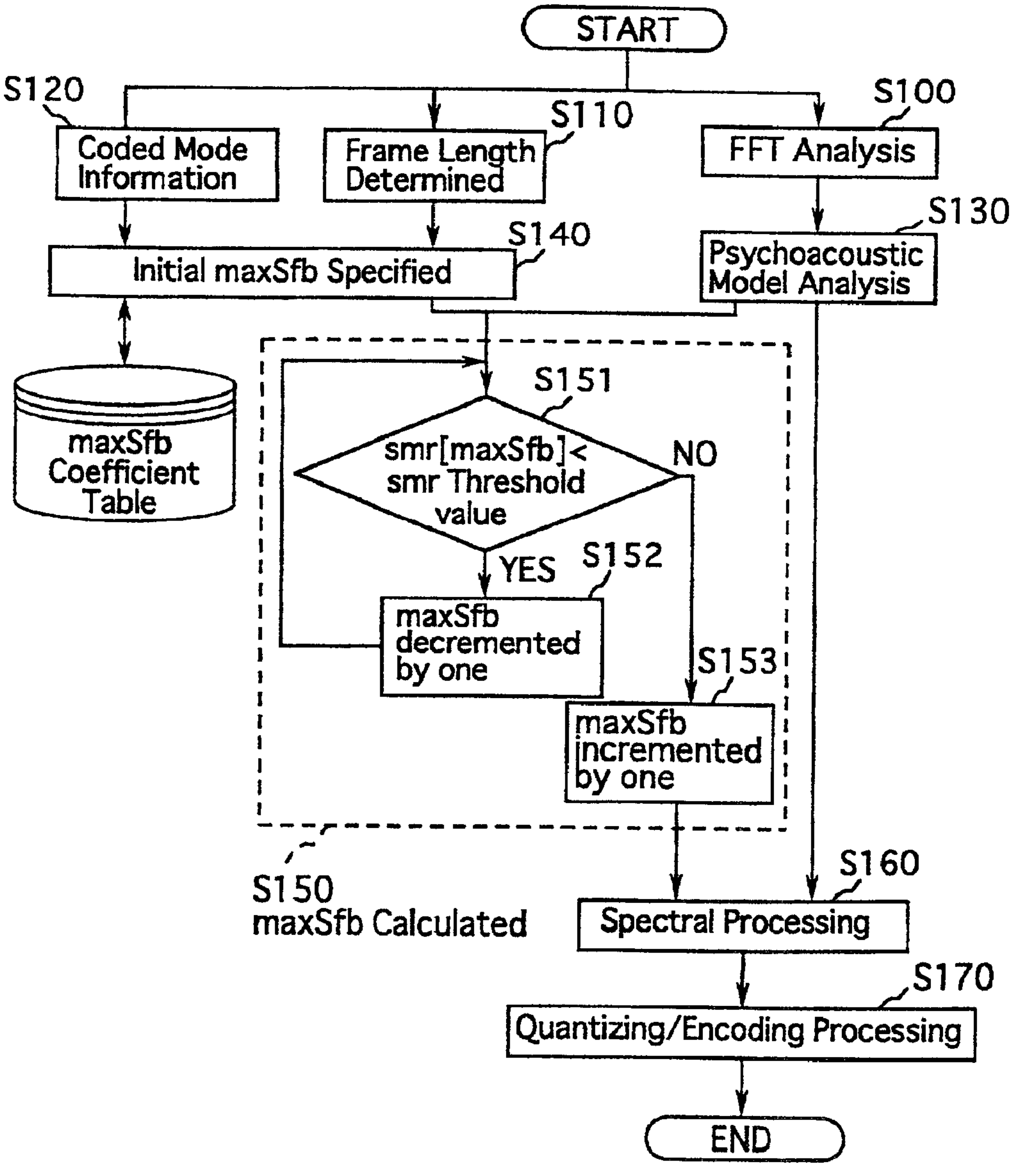
FIG. 8 is a flowchart showing an audio signal encoding method performed by the audio signal encoding apparatus shown in FIG. 1.

Referring now to FIG. 8 of the flowchart, there is shown an audio signal encoding method performed by the first embodiment of the audio signal encoding apparatus.

In the step S100, the FFT analyzing means 1000 is operated to perform FFT analysis to the audio signal to generate frequency information about the audio signal. The step S100 goes forward to the step S130 in which the psychoacoustic model analyzing means 130 is operated to calculate Signal-to-Mask ratio information for the audio signal on the basis of the frequency information about the audio signal thus generated in the step S100. The Signal-to-Mask ratio information includes Signal-to-Mask ratio threshold value information showing a relationship between a plurality of Signal-to-Mask ratios and scale factor bands used to determine Signal-to-Mask ratios for respective scale factor bands.

In the step S110, the frame length determining means 110 is operated to judge whether the audio signal is transient or stationary, and to determine a short-length frame for the audio signal when it is judged that the audio signal is transient and a long-length frame for the audio signal when it is judged that the audio signal is stationary.

In the step S120, the coded mode information inputting means 120 is operated to input coded mode information such as, for example, a sampling frequency and a bit rate of the audio signal therethrough.

In the step S140, the initial maximum scale factor band calculation means 140 is operated to calculate an initial maximum scale factor band and a Signal-to-Mask ratio threshold value for the audio signal on the basis of the result made by the frame length determining means 110 in the step S110 and the coded mode information inputted from the coded mode information means 120 in the step S120 with reference to the initial maximum scale factor band information 410 and the Signal-to-Mask ratio threshold value information 420 stored in the maximum scale factor band table storage means 180.

The step S140 goes forward to the step S150 in which the maximum scale factor band calculation means 150 is operated to calculate a maximum scale factor band for the audio signal on the basis of the initial maximum scale factor band and the Signal-to-Mask ratio threshold value thus calculated by the initial maximum scale factor band calculation means 140 in the step S140 in accordance with the Signal-to-Mask ratio threshold value information showing a relationship between Signal-to-Mask ratios and scale factor bands included in the Signal-to-Mask ratio information calculated by the psychoacoustic model analyzing means 130 in the step S130.

The process performed in the step S150 will be described in details hereinlater.

In the step S151, the maximum scale factor band calculation means 150 is operated to determine a Signal-to-Mask ratio corresponding to a maximum scale factor band wherein the initial value of the maximum scale factor band is the initial maximum scale factor band calculated by the initial maximum scale factor band calculation means 140. The maximum scale factor band calculation means 150 is then operated to judge whether the Signal-to-Mask ratio thus determined is greater than the Signal-to-Mask ratio threshold value.

The step S151 goes forward to the step S152 in which the maximum scale factor band calculation means 150 is operated to decrement the maximum scale factor band by one and to return to the step 151 if it is judged that the Signal-to-Mask ratio is not greater than the Signal-to-Mask ratio threshold value in the step S151.

The step S151 and the step S152 are repeated until it is judged that the Signal-to-Mask ratio is greater than the Signal-to-Mask ratio threshold value in the step S151.

The step S151 goes forward to the step S153 in which the maximum scale factor band calculation means 150 is operated to increment the maximum scale factor band by one if it is judged that the Signal-to-Mask ratio is greater than the Signal-to-Mask ratio threshold value in the step 151.

The step S150, i.e., the step S153 goes forward to the step S160 in which the maximum scale factor band calculation means 150 is operated to output the maximum scale factor band thus incremented by one in the step S153 to the spectral processing means 160 and the spectral processing means 160 is operated to divide the audio signal into a plurality of audio signal components each corresponding to a scale factor band, and to perform spectral processing such as MDCT and TNS to the audio signal up to an audio signal component corresponding to the maximum scale factor band calculated by the maximum scale factor band calculation means 150 in the step S150, on the basis of the Signal-to-Mask ratio information calculated by the psychoacoustic model analyzing means 130 in the step S130 to generate audio signal data.

The step S160 goes forward to the step S170 in which the quantizing and encoding means 170 is operated to quantize and encode the audio signal data generated by the spectral processing means 160 in the step S160 to generate a coded audio signal to be outputted therethrough.

As will be seen from the foregoing description, it is to be understood that the first embodiment of the audio signal encoding apparatus according to the present invention divides an audio signal into a plurality of audio signal components each corresponding to a scale factor band, calculates a maximum scale factor band for the audio signal in accordance with a predetermined psychoacoustic model, and performs spectral processing to, quantizes and encodes the audio signal components up to the audio signal component corresponding to the maximum scale factor band, thereby eliminating the need of processing the audio signal components not audible by the human ear due to the masking effect or below the minimum audible threshold.

In the first embodiment of the audio signal encoding apparatus according to the present invention, the initial maximum scale factor band calculation means 140 calculates an initial maximum scale factor band for the audio signal on the basis of the result made by the frame length determining means 110 and the coded mode information inputted from the coded mode information means 120 with reference to the initial maximum scale factor band information 410 and Signal-to-Mask ratio threshold value information 420 stored in the maximum scale factor band table storage means 180, and the maximum scale factor band calculation means 150 calculates a maximum scale factor band for the audio signal on the basis of the initial maximum scale factor band calculated by the initial maximum scale factor band calculation means 140 in accordance with the Signal-to-Mask ratio information calculated by the psychoacoustic model analyzing means 130. The coded mode information may include bit rates, sampling frequencies, and the number of channels. This means that the first embodiment of the audio signal encoding apparatus according to the present invention can adaptively calculate a maximum scale factor band for the audio signal in accordance with the coded mode information such as bit rates, sampling frequencies, and the number of channels of the audio signal.

In the first embodiment of the audio signal encoding apparatus according to the present invention, the maximum scale factor band calculation means 150 determines a Signal-to-Mask ratio corresponding to a maximum scale factor band and judges whether the Signal-to-Mask ratio thus determined is greater than the Signal-to-Mask ratio threshold value. The maximum scale factor band calculation means 150 decrements the maximum scale factor band by one until the Signal-to-Mask ratio becomes greater than the Signal-to-Mask ratio threshold value, and increments the maximum scale factor band by one when the Signal-to-Mask ratio is greater than the Signal-to-Mask ratio threshold value. The audio signal components higher than the audio signal component corresponding to the maximum scale factor band are difficult to be heard by the human ear due to the masking effect or below the minimum audible threshold. The first embodiment of the audio signal encoding apparatus thus constructed can eliminate the need of processing the audio signal components not audible by the human ear due to the masking effect or below the minimum audible threshold, thereby enhancing the efficiency of the encoding process.

In order to attain the objects of the present invention, the above first embodiment of the ultrasonic probe may be replaced by a second embodiment of the ultrasonic probe, which will be described hereinlater.

Figure 9:
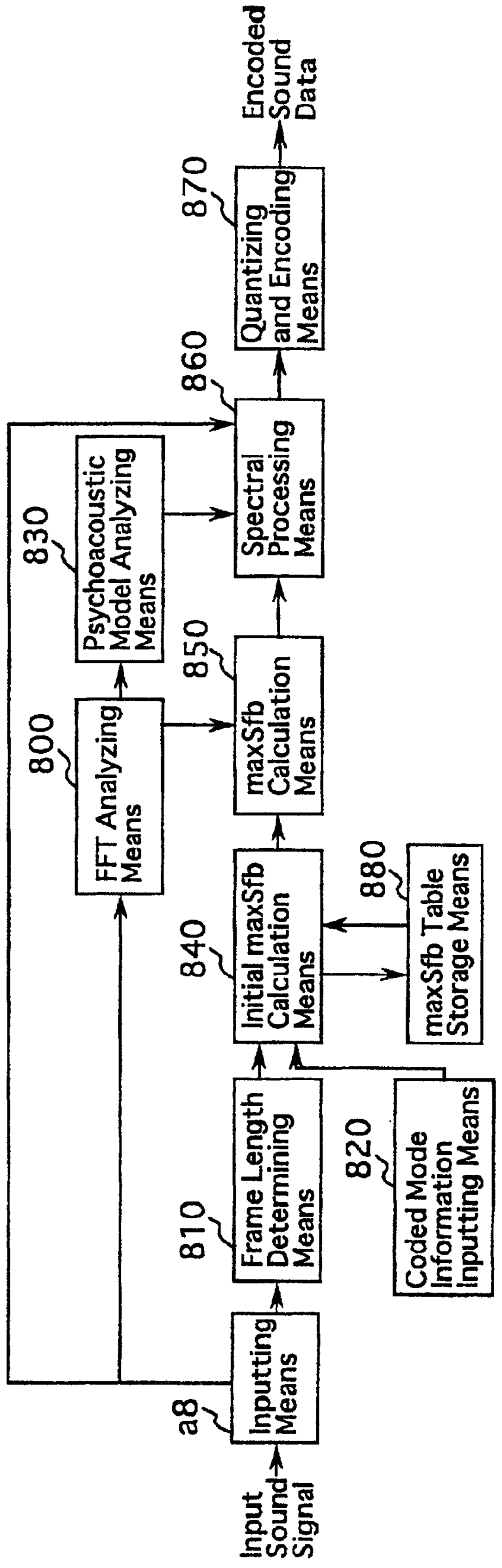
FIG. 9 is a schematic diagram of a second embodiment of the audio signal encoding apparatus according to the present invention.

Referring next to the drawings, in particular, to FIGS. 9 to 13, there is shown a second preferred embodiment of the audio signal encoding apparatus according to the present invention. The second embodiment of the audio signal encoding apparatus is shown in FIG. 9 as comprising inputting means a8, FFT analyzing means 800, frame length determining means 810, coded mode information inputting means 820, psychoacoustic model analyzing means 830, initial maximum scale factor band calculation means 840, maximum scale factor band calculation means 850, spectral processing means 860, quantizing and encoding means 870, and maximum scale factor band table storage means 880.

The second embodiment of the audio signal encoding apparatus is similar in construction to the first embodiment except for the fact that the maximum scale factor band table storage means 880 is adapted to store initial maximum scale factor band information and energy threshold value information, the initial maximum scale factor band calculation means 840 is adapted to calculate an initial maximum scale factor band and an energy threshold value for the audio signal on the basis of the result made by the frame length determining means 810 and the coded mode information inputted from the coded mode information means 820 with reference to the initial maximum scale factor band information and the energy threshold value information stored in the maximum scale factor band table storage means 880, and the maximum scale factor band calculation means 850 is adapted to calculate an energy value table showing a relationship between a plurality of energy values and scale factor bands on the basis of the frequency information generated by the FFT analyzing means 800, and to calculate a maximum scale factor band on the basis of the initial maximum scale factor band and the energy threshold value calculated by the initial maximum scale factor band calculation means 840 with reference to the energy value table thus calculated.

The operation of the second embodiment of the audio signal encoding apparatus will be described hereinafter.

The inputting means a8 is operated to input an audio signal therein. The frame length determining means 810 is operated to judge whether the audio signal inputted from the inputting means a8 is transient or stationary, and determine a short-length frame for the audio signal when it is judged that the audio signal is transient and a long-length frame for the audio signal when it is judged that the audio signal is stationary.

The FFT analyzing means 800 is operated to perform the FFT analysis to the audio signal inputted from the inputting means a8 to generate frequency information about the audio signal. The psychoacoustic model analyzing means 830 is operated to input the frequency information about the audio signal generated by the FFT analyzing means 800 and to calculate Signal-to-Mask ratio information for the audio signal on the basis of the frequency information thus inputted, in accordance with a known, predetermined psychoacoustic model. The coded mode information inputting means 820 is operated to input coded mode information such as, for example, a sampling frequency and a bit rate of the audio signal therethrough in accordance with the operation of an operator.

Figure 10:
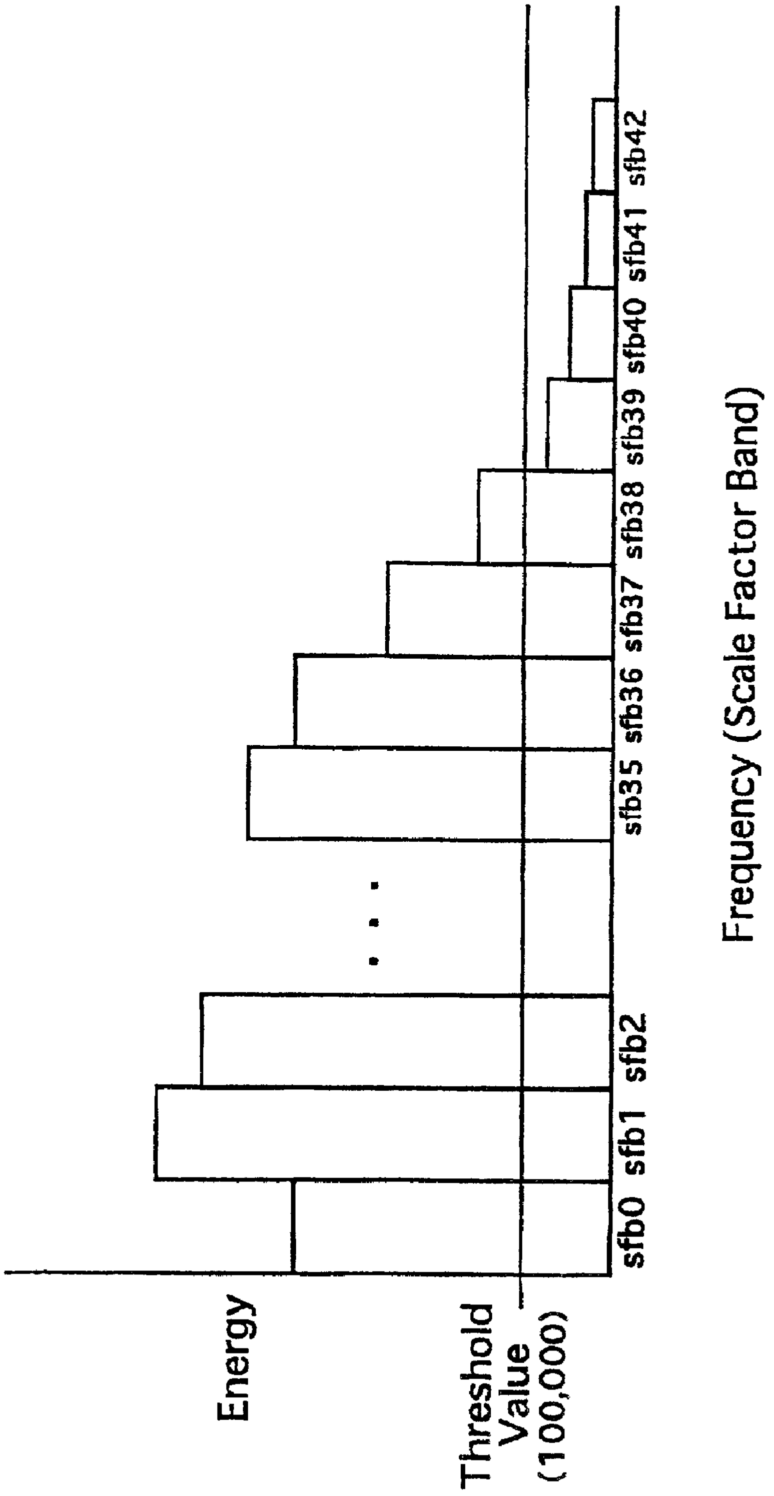
FIG. 10 is a pattern diagram explaining a maximum scale factor band calculation process performed by the audio signal encoding apparatus shown in FIG. 9.

The maximum scale factor band table storage means 880 is operated to store initial maximum scale factor band information and energy threshold value information 820E, not shown. The initial maximum scale factor band calculation means 840 is operated to calculate an initial maximum scale factor band and an energy threshold value for the audio signal on the basis of the result made by the frame length determining means 810 and the coded mode information inputted from the coded mode information means 820 with reference to the initial maximum scale factor band information and the energy threshold value information stored in the maximum scale factor band table storage means 880. In this example, it is assumed that the initial maximum scale factor band calculation means 840 calculates the initial maximum scale factor band "42" and the energy threshold value "10,000" for the audio signal as shown in FIG. 10.

The maximum scale factor band calculation means 850 is operated to calculate an energy value table showing a relationship between a plurality of energy values and scale factor bands on the basis of the frequency information generated by the FFT analyzing means 800, and to calculate a maximum scale factor band on the basis of the initial maximum scale factor band, i.e., "42" and the energy threshold value, "10,000" calculated by the initial maximum scale factor band calculation means 840 with reference to the energy value table thus calculated. The maximum scale factor band calculation means 850 is operated to calculate the energy value table in accordance with Equation (1) as follows:

$$\text{Energy}[sfb] = \sum_{sfb=0}^{sfb=\max Sfb} \sum_{start|sfb|}^{end|sfb|} \text{spectral}[i] * \text{spectral}[i] \qquad \text{Equation (1)}$$

wherein sfb is intended to mean "scale factor band", maxSfb is intended to mean "initial maximum scale factor band", start|sfb| is intended to mean the starting point of a scale factor band, and end|sfb| is intended to mean the end point of the scale factor band.

The spectral processing means 860 is operated to divide the audio signal inputted from the inputting means a8 into a plurality of audio signal components each corresponding to a scale factor band, and to perform spectral processing such as MDCT and TNS to the audio signal components up to an audio signal component corresponding to the maximum scale factor band calculated by the maximum scale factor band calculation means 850, on the basis of the Signal-to-Mask ratio information calculated by the psychoacoustic model analyzing means 830 to generate audio signal data.

The quantizing and encoding means 870 is operated to quantize and encode the audio signal data generated by the spectral processing means 860 to generate a coded audio signal to be outputted therethrough.

Description is now be made how the maximum scale factor band calculation means 850 is operated to calculate a maximum scale factor band for the audio signal with reference to the drawings of FIG. 10.

FIG. 10 is a graph showing a relationship between energy values and scale factor bands calculated by the maximum scale factor band calculation means 850, and an energy threshold value calculated by the initial maximum scale factor band calculation means 840.

The maximum scale factor band calculation means 850 is operated to calculate an energy value table showing a relationship between a plurality of energy values and scale factor bands on the basis of the frequency information generated by the FFT analyzing means 800, and then to calculate a maximum scale factor band on the basis of the initial maximum scale factor band and the energy threshold value calculated by the initial maximum scale factor band calculation means 840 with reference to the energy value table showing a relationship between energy values and scale factor bands through the following steps.

Step (1): The maximum scale factor band calculation means 850 is operated to determine an energy value corresponding to a maximum scale factor band for the audio signal in accordance with the energy value table wherein the initial value of the maximum scale factor band is the initial maximum scale factor band calculated by the initial maximum scale factor band calculation means 840.

Step (2): The maximum scale factor band calculation means 850 is operated to judge whether the energy value determined in the step (1) is greater than the energy threshold value.

Step (2-1): The maximum scale factor band calculation means 850 is operated to decrement the maximum scale factor band by one and to return to the step (1) if it is judged that the energy value is not greater than the energy threshold value in the step (2).

Step (3): The maximum scale factor band calculation means 850 is operated to repeat the step (1) and step (2-1) until it is judged that the energy value is greater than the energy threshold value in the step (2).

Step (4): The maximum scale factor band calculation means 850 is operated to increment the maximum scale factor band by one if it is judged that the energy value is greater than the energy threshold value in the step (2).

In this example, the energy value becomes greater than the energy threshold value "100,000" when the maximum scale factor band is "38" as shown in FIG. 10. The maximum scale factor band calculation means 850 is then operated to increment the maximum scale factor band "38" by one, resulting in the maximum scale factor band "39".

Step (5): The maximum scale factor band calculation means 850 is operated to output the maximum scale factor band thus incremented by one in the step (4) to the spectral processing means 860.

In this example, the maximum scale factor band calculation means 150 is operated to output the maximum scale factor band "39" to the spectral processing means 860.

The following description is directed to the initial maximum scale factor band information and the energy threshold value information 820E stored in the maximum scale factor band table storage means 880. The initial maximum scale factor band information stored in the maximum scale factor band table storage means 880 is similar in construction to the initial maximum scale factor band information 410 shown in FIGS. 4 and 5 while, on the other hand, the energy threshold value information 420E stored in the maximum scale factor band table storage means 880 has a plurality of energy threshold values in relation to the coded mode information.

An example of the energy threshold value information 420E has a plurality of energy threshold values in relation to "bit rates" and "sampling frequencies" with respect to "the number of channels" and "the frame length", as shown in FIGS. 11 and 12. The energy threshold value information 420E shown in FIG. 11(*a*) has a plurality of energy threshold values in relation to bit rates and the sampling frequencies with respect to the number of channels "2 (stereophonic)" and long-length frame. The energy threshold value information 420E shown in FIG. 11(*b*) has a plurality of energy threshold values in relation to bit rates and the sampling frequencies with respect to the number of channels "2 (stereophonic)" and short-length frame. The energy threshold value information 420E shown in FIG. 12(*a*) has a plurality of energy threshold values in relation to bit rates and the sampling frequencies with respect to the number of channels "1 (monophonic)" and long-length frame. The energy threshold value information 420E shown in FIG. 12(*b*) has a plurality of energy threshold values in relation to bit rates and the sampling frequencies with respect to the number of channels "1 (monophonic)" and short-length frame.

The energy threshold value information 420E shown in FIGS. 11 and 12 is created so that the audio signal components not audible by the human ear due to the masking effect or below the minimum audible threshold are hardly encoded similar to the initial maximum scale factor band information 410 shown in FIGS. 4 and 5. The audio signal components corresponding to high frequency bands are difficult to hear while, on the other hand, the audio signal components corresponding to low frequency bands are easy to hear.

In the energy threshold value information 420E, the energy threshold value is raised so that the audio signal components corresponding to high frequency bands are hardly encoded and the audio signal components corresponding to low frequency bands are predominantly encoded when, for example, "the bit rate" is lowered and the number of available bits is consequently decreased. The energy threshold value, on the other hand, is lowered so that the audio signal components corresponding to high frequency bands are encoded to improve the quality of sound when, for example, "the sampling frequency" is lowered, and, consequently, the long-length frame is determined for the frame length and the number of available bits is increased.

Furthermore, the energy threshold value is lowered so that the audio signal components corresponding to high frequency bands are encoded to improve the quality of sound when "the number of channels" is low, and the number of available bits per one frame is consequently decreased. The energy threshold value is also lowered so that the audio signal components corresponding to high frequency bands are encoded to improve the quality of sound when the short-length frame is determined for the audio signal as "the frame length" since it is judged that the audio signal is transient, and the energy of the audio signal components corresponding to the high frequency band is consequently high.

Figure 13:
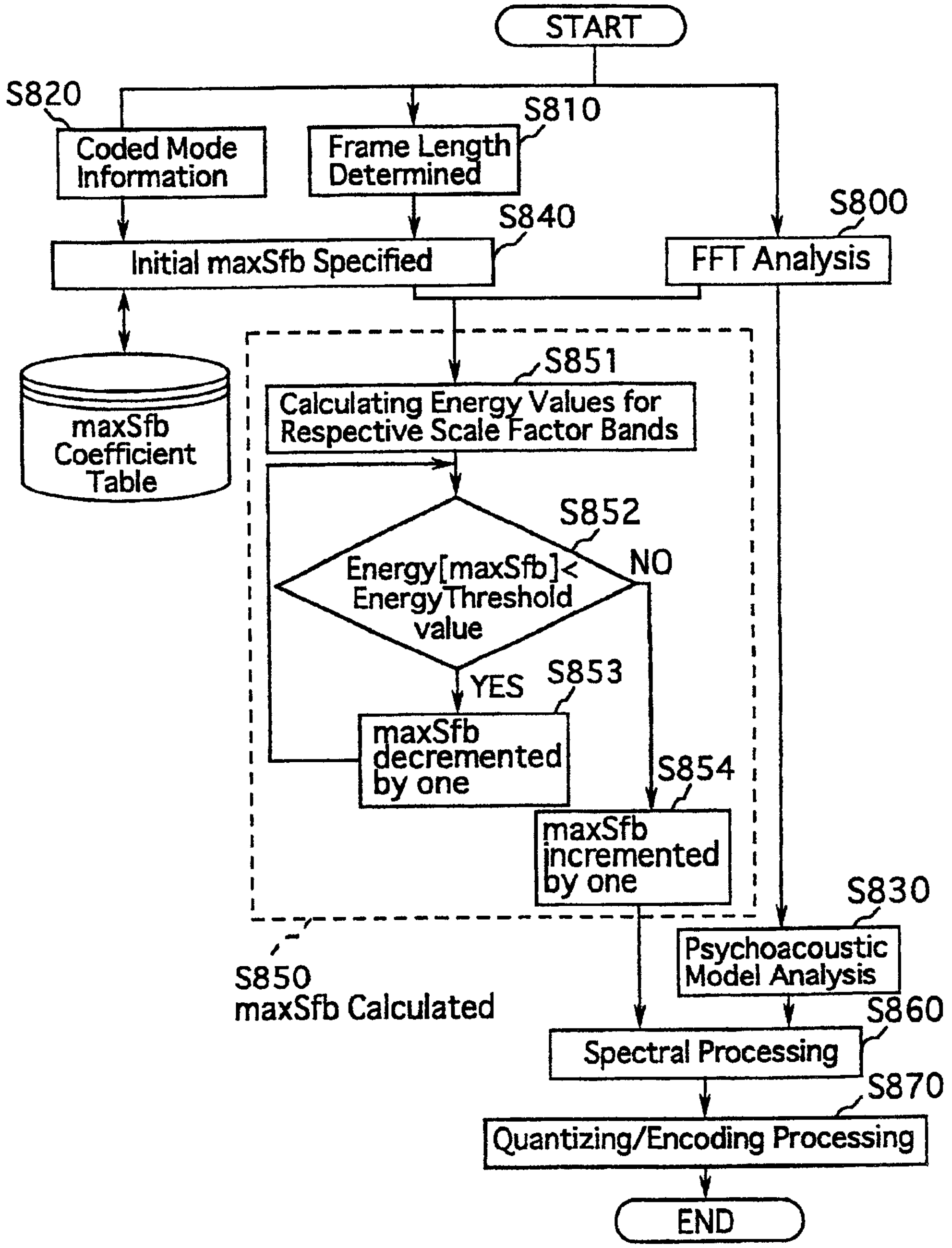
FIG. 13 is a flowchart showing an audio signal encoding method performed by the audio signal encoding apparatus shown in FIG. 9.

Referring now to FIG. 13 of the flowchart, there is shown an audio signal encoding method performed by the second embodiment of the audio signal encoding apparatus.

In the step S810, the frame length determining means 810 is operated to judge whether the audio signal inputted from the inputting means a8 is transient or stationary, and to determine a short-length frame for the audio signal when it is judged that the audio signal is transient and a long-length frame for the audio signal when it is judged that the audio signal is stationary.

In the step S800, the FFT analyzing means 800 is operated to perform the FFT analysis to the audio signal inputted from the inputting means a8 to generate frequency information about the audio signal. The step S800 goes forward to the step S830 in which the psychoacoustic model analyzing means 830 is operated to input the frequency information about the audio signal generated by the FFT analyzing means 800 and to calculate Signal-to-Mask ratio information for the audio signal on the basis of the frequency information thus inputted, in accordance with a known, predetermined psychoacoustic model.

In the step S820, the coded mode information inputting means 820 is operated to input coded mode information such as, for example, a sampling frequency and a bit rate of the audio signal therethrough in accordance with the operation of an operator.

In the step S840, the initial maximum scale factor band calculation means 840 is operated to calculate an initial maximum scale factor band and an energy threshold value for the audio signal on the basis of the result made by the frame length determining means 810 in the step S810 and the coded mode information inputted from the coded mode information means 820 in the step S820 with reference to the initial maximum scale factor band information and the energy threshold value information stored in the maximum scale factor band table storage means 880.

The step S840 goes forward to the step S850 in which the maximum scale factor band calculation means 850 is operated to calculate an energy value table showing a relationship between a plurality of energy values and scale factor bands on the basis of the frequency information generated by the FFT analyzing means 800 in the step S800, and to calculate a maximum scale factor band on the basis of the initial maximum scale factor band and the energy threshold value calculated by the initial maximum scale factor band calculation means 840 in the step S840 with reference to the energy value table thus calculated.

The process performed in the step S850 will be described in details hereinlater.

In the step S851, the maximum scale factor band calculation means 850 is operated to calculate an energy value table showing a relationship between a plurality of energy values and scale factor bands on the basis of the frequency information generated by the FFT analyzing means 800 in the step S800, and to determine an energy value corresponding to a maximum scale factor band for the audio signal in accordance with the energy value table wherein the initial value of the maximum scale factor band is the initial maximum scale factor band calculated by the initial maximum scale factor band calculation means 840.

The step S851 goes forward do the step S852 in which the maximum scale factor band calculation means 850 is operated to judge whether the energy value determined in the step S851 is greater than the energy threshold value.

The step S852 goes forward to the step S853 in which the maximum scale factor band calculation means 850 is operated to decrement the maximum scale factor band by one and to return to the step S852 if it is judged that the energy value is not greater than the energy threshold value in the step S852.

The step S853 and the step S852 are repeated until it is judged that the energy value is greater than the energy threshold value in the step S852.

The step S852 goes forward to the step S854 in which the maximum scale factor band calculation means 850 is operated to increment the maximum scale factor band by one and to output the maximum scale factor band thus incremented to the spectral processing means 860 if it is judged that the energy value is greater than the energy threshold value in the step S852.

The step S850, i.e., the step S854 goes forward to the step S860 in which the spectral processing means 860 is operated to divide the audio signal inputted from the inputting means a8 into a plurality of audio signal components each corresponding to a scale factor band, and to perform spectral processing such as MDCT and TNS to the audio signal components up to an audio signal component corresponding to the maximum scale factor band calculated by the maximum scale factor band calculation means 850 in the step S850, on the basis of the Signal-to-Mask ratio information calculated by the psychoacoustic model analyzing means 830 in the step S830 to generate audio signal data.

The step S860 goes forward to the step S870 in which the quantizing and encoding means 870 is operated to quantize and encode the audio signal data generated by the spectral processing means 860 in the step S860 to generate a coded audio signal to be outputted therethrough.

As will be seen from the foregoing description, it is to be understood that the second embodiment of the audio signal encoding apparatus according to the present invention divides an audio signal inputted therein into a plurality of audio signal components each corresponding to a scale factor band, calculates a maximum scale factor band for the audio signal in accordance with a predetermined psychoacoustic model, and performs spectral processing to, quantizes and encodes the audio signal components up to the audio signal component corresponding to the maximum scale factor band, thereby eliminating the need of processing the audio signal components not audible by the human ear due to the masking effect or below the minimum audible threshold.

In the second embodiment of the audio signal encoding apparatus according to the present invention, the initial maximum scale factor band calculation means 840 calculates an initial maximum scale factor band for an audio signal inputted therein on the basis of the result made by the frame length determining means 810 and the coded mode information inputted from the coded mode information means 820 with reference to the initial maximum scale factor band information and energy threshold value information stored in the maximum scale factor band table storage means 880, and the maximum scale factor band calculation means 850 calculates an energy value table showing a relationship between a plurality of energy values and scale factor bands and then calculates a maximum scale factor band for the audio signal on the basis of the initial maximum scale factor band calculated by the initial maximum scale factor band calculation means 840 with reference to the energy value table thus calculated. The coded mode information may include bit rates, sampling frequencies, and the number of channels. This means that the second embodiment of the audio signal encoding apparatus according to the present invention can adaptively calculate a maximum scale factor band for the audio signal in accordance with the coded mode information such as bit rates, sampling frequencies, and the number of channels of the audio signal.

In the second embodiment of the audio signal encoding apparatus according to the present invention, the maximum scale factor band calculation means 850 determines an energy value corresponding to a maximum scale factor band and judges whether the energy value thus determined is greater than the energy threshold value. The maximum scale factor band calculation means 850 decrements the maximum scale factor band by one until the energy value becomes greater than the energy value threshold value, and increments the maximum scale factor band by one when the energy value is greater than the energy value threshold value. The audio signal components higher than the audio signal component corresponding to the maximum scale factor band are difficult to be heard by the human ear due to the masking effect or below the minimum audible threshold. The second embodiment of the audio signal encoding apparatus thus constructed can eliminate the need of processing the audio signal components not audible by the human ear due to the masking effect or below the minimum audible threshold, thereby enhancing the efficiency of the encoding process.

In order to attain the objects of the present invention, the above second embodiment of the ultrasonic probe may be replaced by a third embodiment of the ultrasonic probe, which will be described hereinlater.

Figure 14:
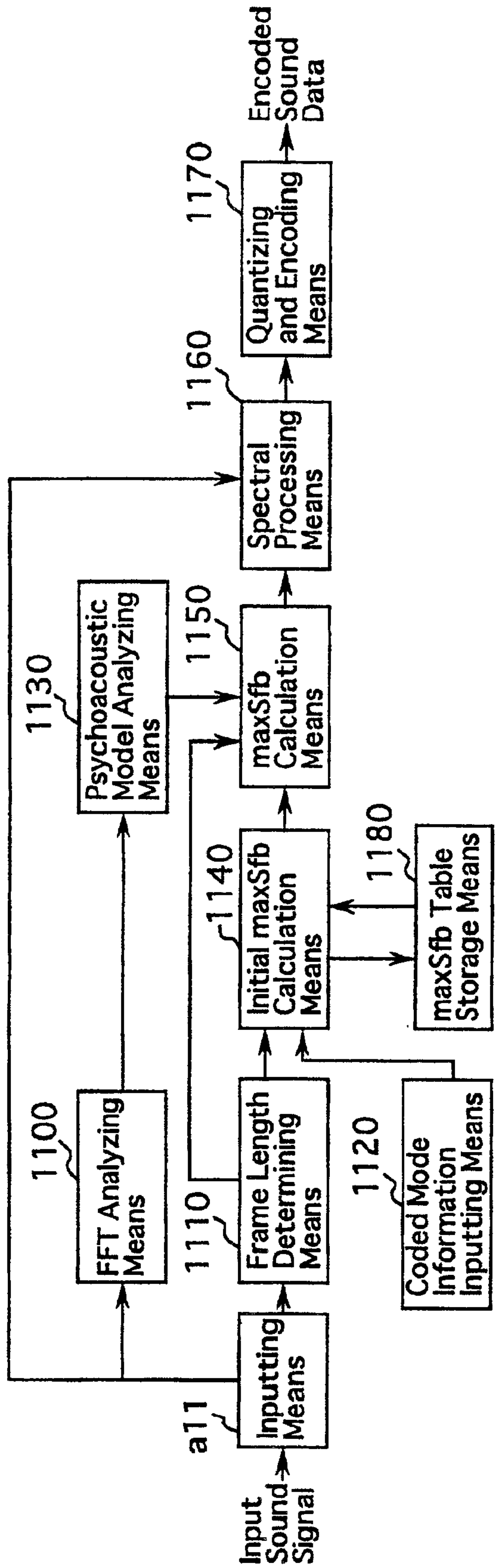
FIG. 14 is a schematic diagram of a third embodiment of the audio signal encoding apparatus according to the present invention.

Referring next to the drawings, in particular, to FIGS. 14 to 17, there is shown a third preferred embodiment of the audio signal encoding apparatus according to the present invention. The third embodiment of the audio signal encoding apparatus is shown in FIG. 14 as comprising inputting means a11, FFT analyzing means 1100, frame length determining means 1110, coded mode information inputting means 1120, psychoacoustic model analyzing means 1130, initial maximum scale factor band calculation means 1140, maximum scale factor band calculation means 1150, spectral processing means 1160, quantizing and encoding means 1170, and maximum scale factor band table storage means 1180.

Figure 16:
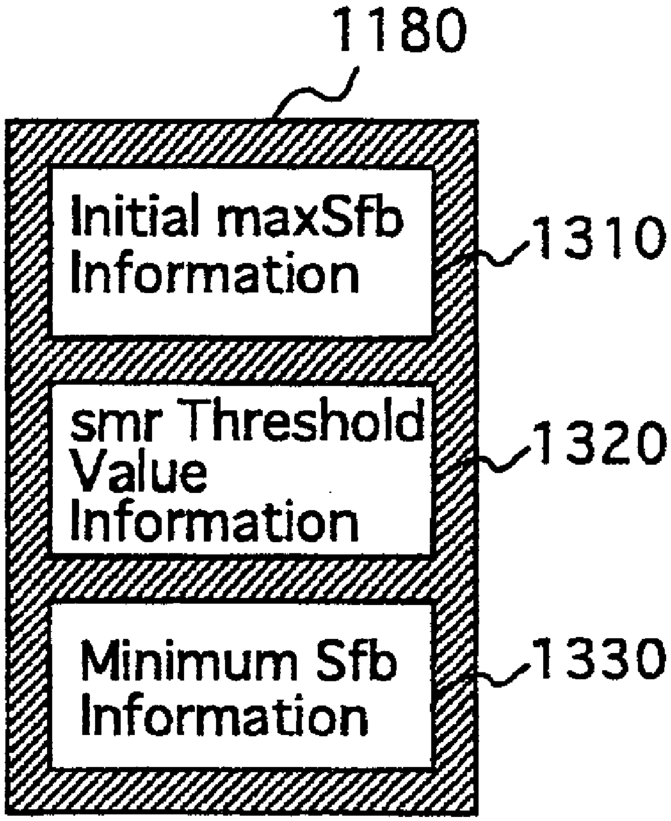
FIG. 16 is a schematic diagram explaining initial maximum scale factor band information, Signal-to-Mask ratio threshold value information, and a minimum scale factor band information stored in maximum scale factor band table storage means forming part of the audio signal encoding apparatus shown in FIG. 14.

The third embodiment of the audio signal encoding apparatus is similar in construction to the first embodiment except for the fact that the maximum scale factor band table storage means 1180 is adapted to store initial maximum scale factor band information 1310, Signal-to-Mask ratio threshold value information 1320, and minimum scale factor band information 1330 as shown in FIG. 16, the initial maximum scale factor band calculation means 1140 is adapted to calculate an initial maximum scale factor band, a Signal-to-Mask ratio threshold value, and a minimum scale factor band for the audio signal on the basis of the result made by the frame length determining means 1110 and the coded mode information inputted from the coded mode information means 1120 with reference to the initial maximum scale factor band information, the Signal-to-Mask ratio threshold value information, and the minimum scale factor band stored in the maximum scale factor band table storage means 1180, and the maximum scale factor band calculation means 1150 is adapted to calculate a maximum scale factor band on the basis of the initial maximum scale factor band, the Signal-to-Mask ratio threshold value, and the minimum scale factor band calculated by the initial maximum scale factor band calculation means 1140 in accordance with the Signal-to-Mask ratio threshold value information showing a relationship between Signal-to-Mask ratio and scale factor bands included in the Signal-to-Mask ratio information calculated by the psychoacoustic model analyzing means 1130.

The following description is directed to the initial maximum scale factor band information 1310, the Signal-to-Mask ratio threshold value information 1320, and the minimum scale factor band information 1330 stored in the maximum scale factor band table storage means 1180. The initial maximum scale factor band information 1310 is similar in construction to the initial maximum scale factor band information 410 shown in FIGS. 4 and 5. The Signal-to-Mask ratio threshold value information 1320 is similar in construction to the Signal-to-Mask ratio threshold value information 420 shown in FIGS. 6 and 7. The minimum scale factor band information 1330, in similar construction to the initial maximum scale factor band information 410 shown in FIGS. 4 and 5. An example of the minimum scale factor band information 1330 has a plurality of minimum scale factor bands in relation to the coded mode information such as "bit rates" and "sampling frequencies" with respect to "the number of channels" and "the frame length".

The operation of the third embodiment of the audio signal encoding apparatus will be described hereinafter.

The inputting means a11 is operated to input an audio signal therein. The frame length determining means 1110 is operated to judge whether the audio signal inputted from the inputting means a11 is transient or stationary, and determine a short-length frame for the audio signal when it is judged that the audio signal is transient and a long-length frame for the audio signal when it is judged that the audio signal is stationary.

The FFT analyzing means 1100 is operated to perform the FFT analysis to the audio signal inputted from the inputting means a11 to generate frequency information about the audio signal. The psychoacoustic model analyzing means 1130 is operated to input the frequency information about the audio signal generated by the FFT analyzing means 1100 and to calculate Signal-to-Mask ratio information showing a relationship between Signal-to-Mask ratio and scale factor bands for the audio signal on the basis of the frequency information thus inputted, in accordance with a known, predetermined psychoacoustic model. The coded mode information inputting means 1120 is operated to input coded mode information such as, for example, a sampling frequency and a bit rate of the audio signal therethrough in accordance with the operation of an operator.

The maximum scale factor band table storage means 1180 is operated to store initial maximum scale factor band information 1310, Signal-to-Mask ratio threshold value information 1320, and minimum scale factor band information 1330 as shown in FIG. 16. The initial maximum scale factor band calculation means 1140 is operated to calculate an initial maximum scale factor band, a Signal-to-Mask ratio threshold value, and a minimum scale factor band for the audio signal on the basis of the result made by the frame length determining means 1110 and the coded mode information inputted from the coded mode information means 1120 with reference to the initial maximum scale factor band information 1310, the Signal-to-Mask ratio threshold value information 1320, and the minimum scale factor band information 1330 stored in the maximum scale factor band table storage means 1180. The maximum scale factor band calculation means 1150 is operated to calculate a maximum scale factor band on the basis of the initial maximum scale factor band, the Signal-to-Mask ratio threshold value, and the minimum scale factor band calculated by the initial maximum scale factor band calculation means 1140 in accordance with the Signal-to-Mask ratio threshold value information showing a relationship between Signal-to-Mask ratio and scale factor bands included in the Signal-to-Mask ratio information calculated by the psychoacoustic model analyzing means 1130.

The spectral processing means 1160 is operated to divide the audio signal inputted from the inputting means a11 into a plurality of audio signal components each corresponding to a scale factor band, and to perform spectral processing such as MDCT and TNS to the audio signal components up to an audio signal component corresponding to the maximum scale factor band calculated by the maximum scale factor band calculation means 1150, on the basis of the Signal-to-Mask ratio information calculated by the psychoacoustic model analyzing means 1130 to generate audio signal data.

The quantizing and encoding means 1170 is operated to quantize and encode the audio signal data generated by the spectral processing means 1160 to generate a coded audio signal to be outputted therethrough.

Figure 15:
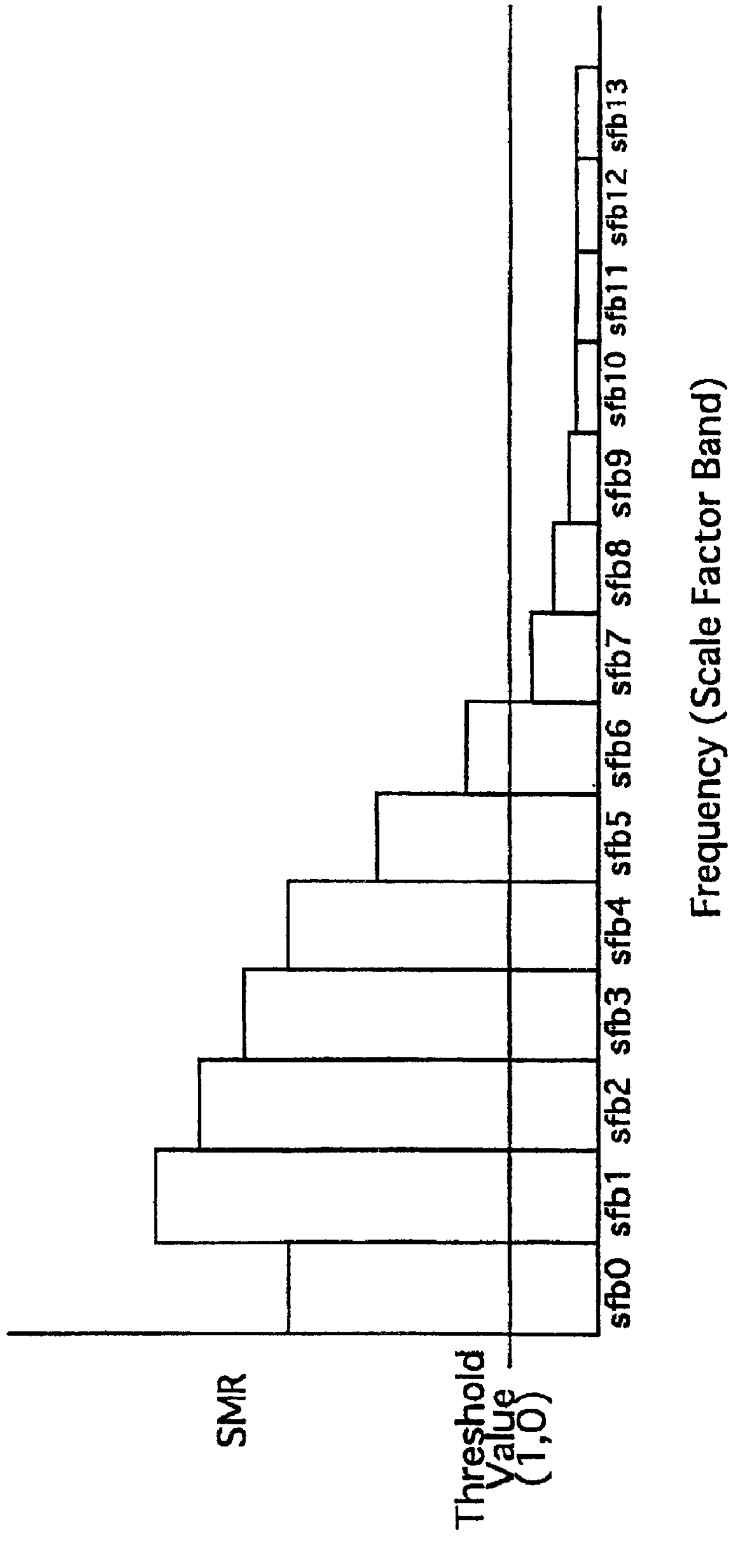
FIG. 15 is a pattern diagram explaining a maximum scale factor band calculation process performed by the audio signal encoding apparatus shown in FIG. 14.

Description is now be made how the maximum scale factor band calculation means 1150 is operated to calculate a maximum scale factor band for the audio signal with reference to the drawings of FIG. 15.

FIG. 15 is a graph showing a relationship between energy values and scale factor bands calculated by the maximum scale factor band calculation means 11150, and an energy threshold value calculated by the initial maximum scale factor band calculation means 1140.

The maximum scale factor band calculation means 1150 is operated to calculate a maximum scale factor band on the basis of the initial maximum scale factor band, the Signal-to-Mask ratio threshold value, and the minimum scale factor band calculated by the initial maximum scale factor band calculation means 1140 in accordance with the Signal-to-Mask ratio threshold value information showing a relationship between Signal-to-Mask ratio and scale factor bands included in the Signal-to-Mask ratio information calculated by the psychoacoustic model analyzing means 1130 through the following steps. In this example, it is assumed that the initial maximum scale factor band is "13", the Signal-to-Mask threshold value is "1.0", and the minimum scale factor band is "11".

Step (1): The maximum scale factor band calculation means 1150 is operated to determine a Signal-to-Mask ratio corresponding to a maximum scale factor band for the audio signal in accordance with the Signal-to-Mask ratio threshold value information wherein the initial value of the maximum scale factor band is the initial maximum scale factor band calculated by the initial maximum scale factor band calculation means 1140.

Step (2): The maximum scale factor band calculation means 1150 is operated to judge whether the Signal-to-Mask ratio determined in the step (1) is greater than the Signal-to-Mask ratio threshold value.

Step (2-1): The maximum scale factor band calculation means 1150 is operated to decrement the maximum scale factor band by one if it is judged that the Signal-to-Mask ratio is not greater than the Signal-to-Mask ratio threshold value in the step (2).

Step (3): The maximum scale factor band calculation means 1150 is operated to repeat the step (1) to step (2-1) until it is judged that the Signal-to-Mask ratio is greater than the Signal-to-Mask ratio threshold value in the step (2).

Step (4): The maximum scale factor band calculation means 1150 is operated to increment the maximum scale factor band by one if it is judged that the Signal-to-Mask ratio is greater than the Signal-to-Mask ratio threshold value in the step (2).

In this example, the Signal-to-Mask ratio becomes greater than the Signal-to-Mask ratio threshold value when the maximum scale factor band is "6" as shown in FIG. 15. The maximum scale factor band calculation means 1150 is then operated to increment the maximum scale factor band "6" by one, resulting in the maximum scale factor band "7".

Step (5): The maximum scale factor band calculation means 1150 is operated to judge whether the maximum scale factor band thus incremented by one in the step (4) is less than the minimum scale factor band.

Step (6): The maximum scale factor band calculation means 1150 is operated to increment the minimum scale factor band by one, replace the maximum scale factor band with the minimum scale factor band thus incremented by one, and outputting the maximum scale factor band thus replaced to the spectral processing means 1160 if is judged that the maximum scale factor band is less than the minimum scale factor band in the step (5).

Step (7): The maximum scale factor band calculation means 1150 is operated to output the maximum scale factor band to the spectral processing means 1160 if it is judged that the maximum scale factor band is not less than the minimum scale factor band in the step (5).

In this example, the maximum scale factor band "7" thus incremented by one is less than the minimum scale factor band "11" in the step (5). The maximum scale factor band calculation means 1150 is operated to increment the minimum scale factor band "11" by one, to replace the maximum scale factor band "7" with the minimum scale factor band "12" thus incremented by one, and outputting the maximum scale factor band "12" thus replaced to the spectral processing means 1160 in the step (7).

The third embodiment of the audio signal encoding apparatus thus constructed can prevent the maximum scale factor band from being too low to ensure that a minimum range of audio signal components are to be processed, thereby enhancing the quality of sound.

Figure 17:
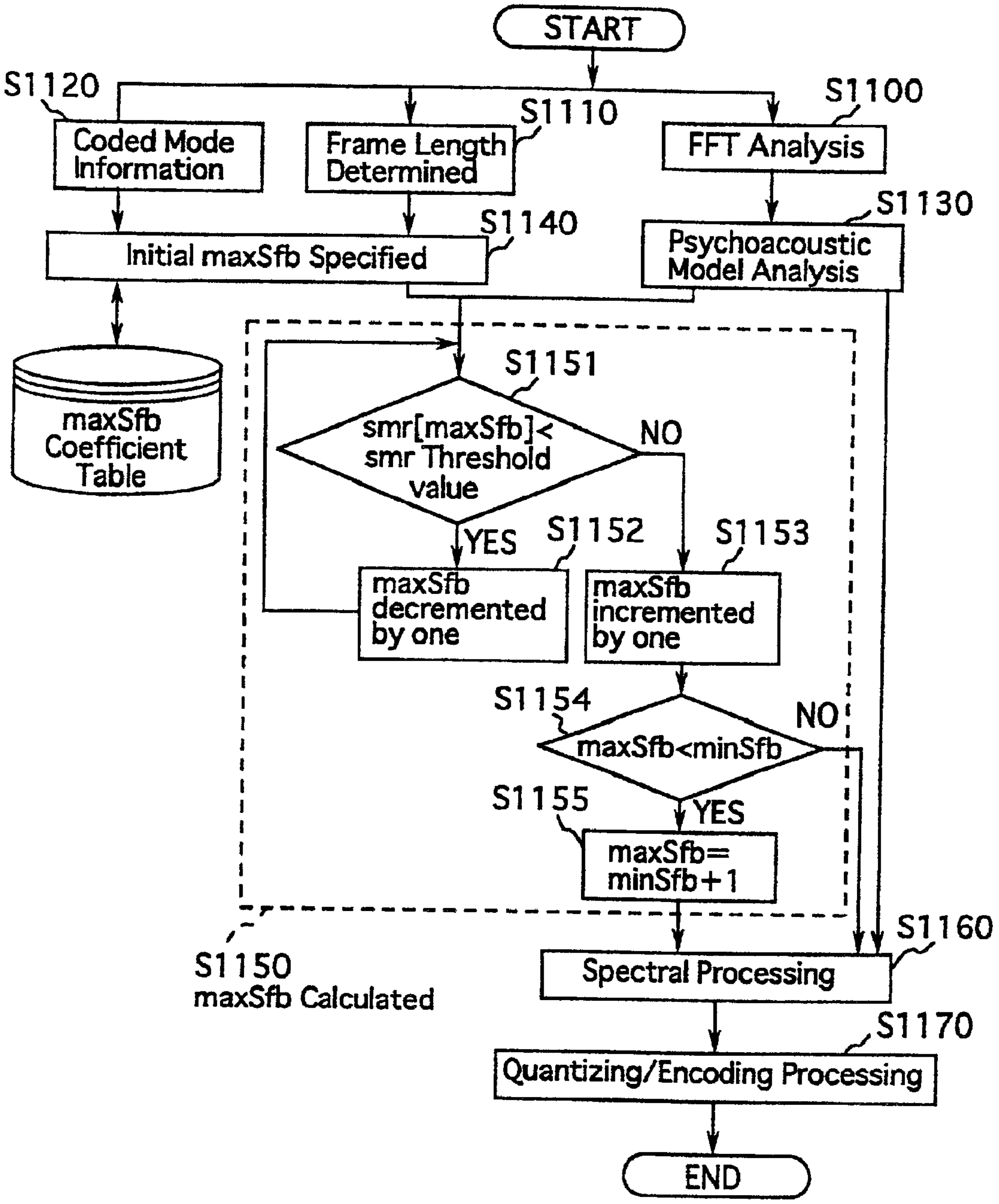
FIG. 17 is a flowchart showing an audio signal encoding method performed by the audio signal encoding apparatus shown in FIG. 14.
Figure 19:
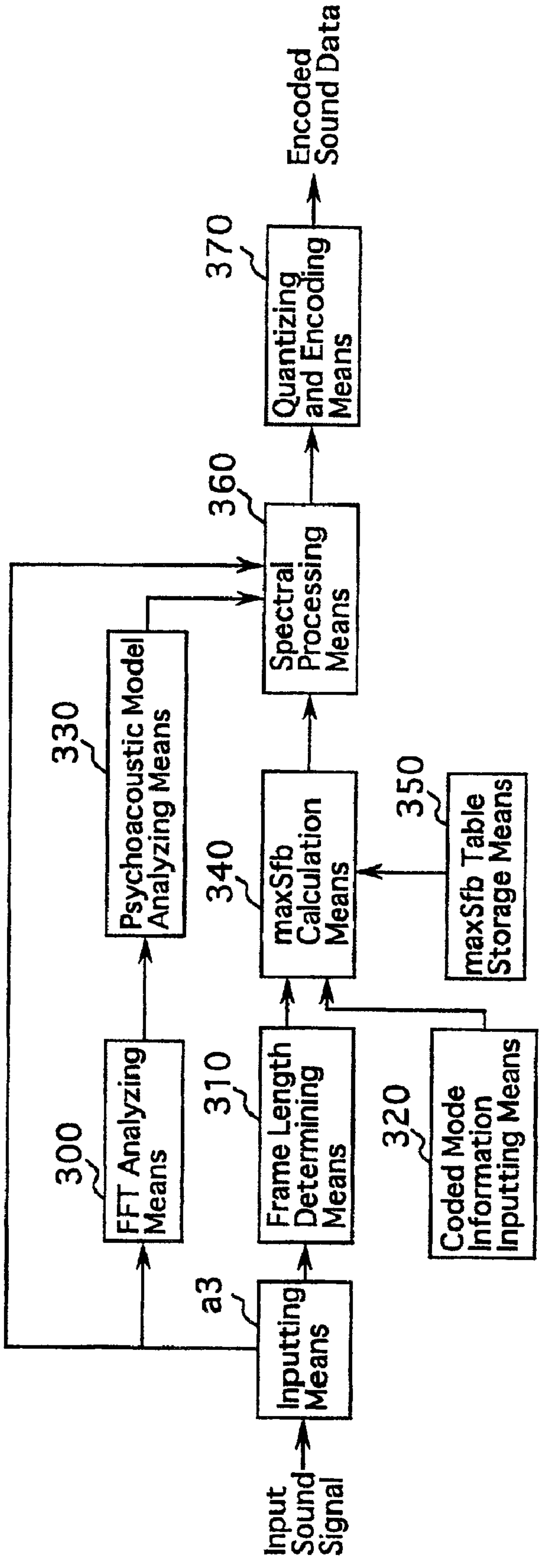
FIG. 19 PRIOR ART
FIG. 19 is a schematic diagram of a conventional audio signal encoding apparatus.

Referring to FIG. 17 of the flowchart, there is shown an audio signal encoding method performed by the third embodiment of the audio signal encoding apparatus.

In the step S1110, the frame length determining means 1110 is operated to judge whether the audio signal inputted from the inputting means a11 is transient or stationary, and determine a short-length frame for the audio signal when it is judged that the audio signal is transient and a long-length frame for the audio signal when it is judged that the audio signal is stationary.

In the step S1100, the FFT analyzing means 1100 is operated to perform the FFT analysis to the audio signal inputted from the inputting means a11 to generate frequency information about the audio signal. The step S1100 goes forward to the step S1130 in which the psychoacoustic model analyzing means 1130 is operated to input the frequency information about the audio signal generated by the FFT analyzing means 1100 and to calculate Signal-to-Mask ratio information showing a relationship between Signal-to-Mask ratio and scale factor bands for the audio signal on the basis of the frequency information thus inputted, in accordance with a known, predetermined psychoacoustic model.

In the step S1120, the coded mode information inputting means 1120 is operated to input coded mode information such as, for example, a sampling frequency and a bit rate of the audio signal therethrough in accordance with the operation of an operator.

In the step S1140, the initial maximum scale factor band calculation means 1140 is operated to calculate an initial maximum scale factor band, a Signal-to-Mask ratio threshold value, and a minimum scale factor band for the audio signal on the basis of the result made by the frame length determining means 1110 in the step S1110 and the coded mode information inputted from the coded mode information means 1120 in the step S1120 with reference to the initial maximum scale factor band information 1310, the Signal-to-Mask ratio threshold value information 1320, and the minimum scale factor band information 1330 stored in the maximum scale factor band table storage means 1180.

In the step S1150, the maximum scale factor band calculation means 1150 is operated to calculate a maximum scale factor band on the basis of the initial maximum scale factor band, the Signal-to-Mask ratio threshold value, and the minimum scale factor band calculated by the initial maximum scale factor band calculation means 1140 in the step S1140 in accordance with the Signal-to-Mask ratio threshold value information showing a relationship between Signal-to-Mask ratio and scale factor bands included in the Signal-to-Mask ratio information calculated by the psychoacoustic model analyzing means 1130 in the step S1130.

Description is now be made how the maximum scale factor band calculation means 1150 is operated to calculate a maximum scale factor band for the audio signal with reference to the drawings of FIG. 15.

FIG. 15 is a graph showing a relationship between energy values and scale factor bands calculated by the maximum scale factor band calculation means 11150, and an energy threshold value calculated by the initial maximum scale factor band calculation means 1140.

The maximum scale factor band calculation means 1150 is operated to calculate a maximum scale factor band on the basis of the initial maximum scale factor band, the Signal-to-Mask ratio threshold value, and the minimum scale factor band calculated by the initial maximum scale factor band calculation means 1140 in accordance with the Signal-to-Mask ratio threshold value information showing a relationship between Signal-to-Mask ratio and scale factor bands included in the Signal-to-Mask ratio information calculated by the psychoacoustic model analyzing means 1130 through the following steps. In this example, it is assumed that the initial maximum scale factor band is "13", the Signal-to-Mask threshold value is "1.0", and the minimum scale factor band is "11".

In the step S1151, the maximum scale factor band calculation means 1150 is operated to determine a Signal-to-Mask ratio corresponding to a maximum scale factor band for the audio signal in accordance with the Signal-to-Mask ratio threshold value information wherein the initial value of the maximum scale factor band is the initial maximum scale factor band calculated by the initial maximum scale factor band calculation means 1140 in the step S1140, then, the maximum scale factor band calculation means 1150 is operated to judge whether the Signal-to-Mask ratio thus determined is greater than the Signal-to-Mask ratio threshold value. In this example, the initial maximum scale factor band "13" is calculated.

The step S1151 goes forward to the step S1152 in which the maximum scale factor band calculation means 1150 is operated to decrement the maximum scale factor band by one if it is judged that the Signal-to-Mask ratio is not greater than the Signal-to-Mask ratio threshold value in the step S1151.

The step S1152 and the step S1151 are repeated until it is judged that the Signal-to-Mask ratio is greater than the Signal-to-Mask ratio threshold value in the step S1151.

The step S1151 goes forward to the step S1153 in which the maximum scale factor band calculation means 1150 is operated to increment the maximum scale factor band by one if it is judged that the Signal-to-Mask ratio is greater than the Signal-to-Mask ratio threshold value in the step S1151.

In this example, the Signal-to-Mask ratio becomes greater than the Signal-to-Mask ratio threshold value when the maximum scale factor band is "6" as shown in FIG. 15. The maximum scale factor band calculation means 1150 is then operated to increment the maximum scale factor band "6" by one, resulting in the maximum scale factor band "7".

The step S1153 goes forward to the step S1154 in which the maximum scale factor band calculation means 1150 is operated to judge whether the maximum scale factor band thus incremented by one in the step S1153 is less than the minimum scale factor band.

The step S1154 goes forward to the step S1155 in which the maximum scale factor band calculation means 1150 is operated to increment the minimum scale factor band by one, replace the maximum scale factor band with the minimum scale factor band thus incremented by one, and outputting the maximum scale factor band thus replaced to the spectral processing means 1160 if is judged that the maximum scale factor band is less than the minimum scale factor band in the step S1154.

In this example, the maximum scale factor band "7" calculated in the step S1153 is less than the minimum scale factor band "11". The maximum scale factor band calculation means 1150 increments the minimum scale factor band "11" by one, replace the maximum scale factor band "7" with "12", i.e., the minimum scale factor band incremented by one, and outputs the maximum scale factor band "12" thus replaced to the spectral processing means 1160.

The step S1154 goes forward to the step S1160 in which the maximum scale factor band calculation means 1150 is operated to output the maximum scale factor band to the spectral processing means 1160 if it is judged that the maximum scale factor band is not less than the minimum scale factor band in the step S1154.

The step S1150, i.e., the step S1154 or the step S1155 goes forward to the step S1160 in which the spectral processing means 1160 is operated to divide the audio signal inputted from the inputting means a11 into a plurality of audio signal components each corresponding to a scale factor band, and to perform spectral processing such as MDCT and TNS to the audio signal components up to an audio signal component corresponding to the maximum scale factor band calculated by the maximum scale factor band calculation means 1150 in the step S1150, on the basis of the Signal-to-Mask ratio information calculated by the psychoacoustic model analyzing means 1130 in the step S1130 to generate audio signal data.

The step S1160 goes forward to the step S1170 in which the quantizing and encoding means 1170 is operated to quantize and encode the audio signal data generated by the spectral processing means 1160 in the step S1160 to generate a coded audio signal to be outputted therethrough.

As will be seen from the foregoing description, it is to be understood that the third embodiment of the audio signal encoding apparatus according to the present invention divides an audio signal into a plurality of audio signal components each corresponding to a scale factor band, calculates a maximum scale factor band for the audio signal in accordance with a predetermined psychoacoustic model, and performs spectral processing to, quantizes and encodes the audio signal components up to the audio signal component corresponding to the maximum scale factor band, thereby eliminating the need of processing the audio signal components not audible by the human ear due to the masking effect or below the minimum audible threshold.

In the third embodiment of the audio signal encoding apparatus according to the present invention, the initial maximum scale factor band calculation means 1140 calculates an initial maximum scale factor band for the audio signal on the basis of the result made by the frame length determining means 1110 and the coded mode information inputted from the coded mode information means 1120 with reference to the initial maximum scale factor band information, the minimum scale factor band information, and Signal-to-Mask ratio threshold value information stored in the maximum scale factor band table storage means 1180, the maximum scale factor band calculation means 1150 calculates a maximum scale factor band for the audio signal on the basis of the initial maximum scale factor band and the minimum scale factor band calculated by the initial maximum scale factor band calculation means 1140 in accordance with the Signal-to-Mask ratio information calculated by the psychoacoustic model analyzing means 1130. The coded mode information may include bit rates, sampling frequencies, and the number of channels. This means that the third embodiment of the audio signal encoding apparatus according to the present invention can adaptively calculate a maximum scale factor band for the audio signal in accordance with the coded mode information such as bit rates, sampling frequencies, and the number of channels of the audio signal.

In the third embodiment of the audio signal encoding apparatus according to the present invention, the maximum scale factor band calculation means 1150 determines a Signal-to-Mask ratio corresponding to a maximum scale factor band and judges whether the Signal-to-Mask ratio thus determined is greater than the Signal-to-Mask ratio threshold value. The maximum scale factor band calculation means 1150 decrements the maximum scale factor band by one until the Signal-to-Mask ratio becomes greater than the Signal-to-Mask ratio threshold value, and increments the maximum scale factor band by one when the Signal-to-Mask ratio is greater than the Signal-to-Mask ratio threshold value. The audio signal components higher than the audio signal component corresponding to the maximum scale factor band are difficult to be heard by the human ear due to the masking effect or below the minimum audible threshold. Furthermore, the maximum scale factor band calculation means 1150 judges whether the maximum scale factor band thus incremented is less than the minimum scale factor band. The maximum scale factor band calculation means 1150 increments the minimum scale factor band by one, replaces the maximum scale factor band with the minimum scale factor band thus incremented if it is judged that the maximum scale factor band is less than the minimum scale factor band.

The third embodiment of the audio signal encoding apparatus thus constructed can eliminate the need of processing the audio signal components not audible by the human ear due to the masking effect or below the minimum audible threshold, thereby enhancing the efficiency of the encoding process. Furthermore, the third embodiment of the audio signal encoding apparatus thus constructed can prevent the maximum scale factor band from being too low to ensure that a minimum range of audio signal components are to be processed, thereby enhancing the quality of sound.

According to the present invention, all the functions of the second or third embodiment of the audio signal encoding apparatus may be performed by a personal computer comprising a central processing unit, hereinlater referred to as a "CPU", a sound device such as a sound card, and computer usable storage medium such as a floppy disk, a CD-ROM, a DVD-ROM, a hard disk, and so on, having computer readable code embodied therein for executing all of the functions of the aforesaid constituent elements of the second or third embodiment of the audio signal encoding apparatus.

Furthermore, the second or third embodiment of the audio signal encoding apparatus may be applied to a music distribution service required to encode a sound signal of high quality or in complex encoding mode.

It will be apparent to those skilled in the art and it is contemplated that variations and/or changes in the embodiments illustrated and described herein may be without departure from the present invention. Accordingly, it is intended that the foregoing description is illustrative only, not limiting, and that the true spirit and scope of the present invention will be determined by the appended claims.

What is claimed is:

1. An audio signal encoding apparatus for dividing audio signal into a plurality of audio signal components each corresponding to a scale factor band to be encoded in accordance with a predetermined psychoacoustic model, comprising:

inputting means for inputting said audio signal therein;

frame length determining means for judging whether said audio signal inputted from said inputting means is transient or stationary, and determining a short-length frame for said audio signal when it is judged that said audio signal is transient and a long-length frame for said audio signal when it is judged that said audio signal is stationary;

FFT analyzing means for performing the fast Fourier transform to said audio signal inputted from said inputting means to generate frequency information about said audio signal;

coded mode information inputting means for inputting coded mode information;

psychoacoustic model analyzing means for calculating Signal-to-Mask ratio information for said audio signal on the basis of said frequency information about said audio signal generated by said FFT analyzing means, in accordance with said predetermined psychoacoustic model;

maximum scale factor band table storage means for storing initial maximum scale factor band information and Signal-to-Mask ratio threshold value information;

initial maximum scale factor band calculation means for calculating an initial maximum scale factor band for said audio signal on the basis of the result made by said frame length determining means and said coded mode information inputted from said coded mode information inputting means with reference to said initial maximum scale factor band information and said Signal-to-Mask ratio threshold value information stored in said maximum scale factor band table storage means;

maximum scale factor band calculation means for calculating a maximum scale factor band for said audio signal on the basis of said initial maximum scale factor band calculated by said initial maximum scale factor band calculation means in accordance with said Signal-to-Mask ratio information calculated by said psychoacoustic model analyzing means;

spectral processing means for dividing said audio signal inputted from said inputting means into a plurality of audio signal components each corresponding to a scale factor band, and performing spectral processing to said audio signal components up to an audio signal component corresponding to said maximum scale factor band calculated by said maximum scale factor band calculation means, on the basis of said Signal-to-Mask ratio information calculated by said psychoacoustic model analyzing means to generate audio signal data; and quantizing and encoding means for quantizing and encoding said audio signal data generated by said spectral processing means to generate a coded audio signal to be outputted therethrough, whereby said maximum scale factor band calculation means is operative to adaptively calculate said maximum scale factor band in response to said audio signal inputted therein.

2. An audio signal encoding apparatus as set forth in claim 1, in which said coded mode information includes bit rate information and sampling frequency information, said maximum scale factor band table storage means is operative to store initial maximum scale factor band information having a plurality of scale factor bands in relation to the bit rate information and the sampling frequency information and Signal-to-Mask ratio threshold value information having a plurality of Signal-to-Mask ratio threshold values in relation to the bit rate information and the sampling frequency information, said initial maximum scale factor band calculation means is operative to calculate an initial maximum scale factor band for said audio signal on the basis of the result made by said frame length determining means and said coded mode information including said bit rate information and said sampling frequency information inputted from said coded mode information inputting means with reference to said initial maximum scale factor band information and Signal-to-Mask ratio threshold value information stored in said maximum scale factor band table storage means, and said maximum scale factor band calculation means is operative to calculate a maximum scale factor band for said audio signal on the basis of said Signal-to-Mask ratio information calculated by said psychoacoustic model analyzing means and said initial maximum scale factor band calculated by said initial maximum scale factor band calculation means.

3. An audio signal encoding apparatus as set forth in claim 2, in which said coded mode information further includes the number of channels, said maximum scale factor band table storage means is operative to store initial maximum scale factor band information having a plurality of scale factor bands in relation to the number of channels and Signal-to-Mask ratio threshold value information having a plurality of Signal-to-Mask ratio threshold values in relation to the number of channels, said initial maximum scale factor band calculation means is operative to calculate an initial maximum scale factor band for said audio signal on the basis of the result made by said frame length determining means and said coded mode information including the number of channels inputted from said coded mode information inputting means with reference to said initial maximum scale factor band information and Signal-to-Mask ratio threshold value information stored in said maximum scale factor band table storage means, and said maximum scale factor band calculation means is operative to calculate a maximum scale factor band for said audio signal on the basis of said Signal-to-Mask ratio information calculated by said psychoacoustic model analyzing means and said initial maximum scale factor band calculated by said initial maximum scale factor band calculation means.

4. An audio signal encoding apparatus as set forth in claim 1, in which said Signal-to-Mask ratio information includes a Signal-to-Mask ratio table showing a relationship between a plurality of Signal-to-Mask ratios and scale factor bands, said maximum scale factor band table storage means is operative to store initial maximum scale factor band information and Signal-to-Mask ratio threshold value information, said initial maximum scale factor band calculation means is operative to calculate an initial maximum scale factor band and a Signal-to-Mask ratio threshold value for said audio signal on the basis of the result made by said frame length determining means and said coded mode information inputted from said coded mode information inputting means with reference to said initial maximum scale factor band information and said Signal-to-Mask ratio threshold value information stored in said maximum scale factor band table storage means, and said maximum scale factor band calculation means is operative to calculate a maximum scale factor band for said audio signal on the basis of said initial maximum scale factor band and said Signal-to-Mask ratio threshold value calculated by said initial maximum scale factor band calculation means in accordance with said Signal-to-Mask ratio table showing a relationship between Signal-to-Mask ratios and scale factor bands included in said Signal-to-Mask ratio information calculated by said psychoacoustic model analyzing means through the steps of:

(1) determining a Signal-to-Mask ratio corresponding to a maximum scale factor band in accordance with said Signal-to-Mask ratio table wherein the initial value of said maximum scale factor band is said initial maximum scale factor band calculated by said initial maximum scale factor band calculation means;

(2) judging whether said Signal-to-Mask ratio determined in said step (1) is greater than said Signal-to-Mask ratio threshold value;

(2-1) decrementing said maximum scale factor band by one and returning to said step (1) if it is judged that said Signal-to-Mask ratio is not greater than said Signal-to-Mask ratio threshold value in said step (2);

(3) repeating said step (1) to step (2-1) until it is judged that said Signal-to-Mask ratio is greater than said Signal-to-Mask ratio threshold value in said step (2);

(4) incrementing said maximum scale factor band by one if it is judged that said Signal-to-Mask ratio is greater than said Signal-to-Mask ratio threshold value in said step (2); and (5) outputting said maximum scale factor band thus incremented by one in said step (4) to said spectral processing means.

5. An audio signal encoding apparatus as set forth in claim 1, in which said maximum scale factor band table storage means is operative to store initial maximum scale factor band information and energy threshold value information, said initial maximum scale factor band calculation means is operative to calculate an initial maximum scale factor band and an energy threshold value for said audio signal on the basis of the result made by said frame length determining means and said coded mode information inputted from said coded mode information inputting means with reference to said initial maximum scale factor band information and said energy threshold value information stored in said maximum scale factor band table storage means, and said maximum scale factor band calculation means is operative to calculate an energy value table showing a relationship between a plurality of energy values and scale factor bands on the basis of said frequency information generated by said FFT analyzing means, and to calculate a maximum scale factor band for said audio signal on the basis of said initial maximum scale factor band and said energy threshold value calculated by said initial maximum scale factor band calculation means with reference to said energy value table showing a relationship between energy values and scale factor bands through the steps of:

(1) determining an energy value corresponding to a maximum scale factor band in accordance with said energy value table wherein said initial value of said maximum scale factor band is said initial maximum scale factor band calculated by said initial maximum scale factor band calculation means;

(2) judging whether said energy value determined in said step (1) is greater than said energy threshold value;

(2-1) decrementing said maximum scale factor band by one and returning to said step (1) if it is judged that said energy value is not greater than said energy threshold value in said step (2);

(3) repeating said step (1) and step (2-1) until it is judged that said energy value is greater than said energy threshold value in said step (2);

(4) incrementing said maximum scale factor band by one if it is judged that said energy value is greater than said energy threshold value in said step (2), and (5) outputting said maximum scale factor band thus incremented by one in said step (4) to said spectral processing means.

6. An audio signal encoding apparatus as set forth in claim 1, in which said Signal-to-Mask ratio information includes a Signal-to-Mask ratio table showing a relationship between a plurality of Signal-to-Mask ratios and scale factor bands, said maximum scale factor band table storage means is operative to store initial maximum scale factor band information, Signal-to-Mask ratio threshold value information, and minimum scale factor band information, said initial maximum scale factor band calculation means is operative to calculate an initial maximum scale factor band, a Signal-to-Mask ratio threshold value, and a minimum scale factor band for said audio signal on the basis of the result made by said frame length determining means and said coded mode information inputted from said coded mode information inputting means with reference to said initial maximum scale factor band information, said Signal-to-Mask ratio threshold value information, and said minimum scale factor band information stored in said maximum scale factor band table storage means, and said maximum scale factor band calculation means is operative to calculate a maximum scale factor band for said audio signal on the basis of said initial maximum scale factor band, said Signal-to-Mask ratio threshold value, and said minimum scale factor band calculated by said initial maximum scale factor band calculation means in accordance with said Signal-to-Mask ratio table showing a relationship between Signal-to-Mask ratio and scale factor bands included in said Signal-to-Mask ratio information calculated by said psychoacoustic model analyzing means through the steps of:

(1) determining a Signal-to-Mask ratio corresponding to a maximum scale factor band in accordance with said Signal-to-Mask ratio table wherein the initial value of said maximum scale factor band is said initial maximum scale factor band calculated by said initial maximum scale factor band calculation means;

(2) judging whether said Signal-to-Mask ratio determined in said step (1) is greater than said Signal-to-Mask ratio threshold value;

(2-1) decrementing said maximum scale factor band by one if it is judged that said Signal-to-Mask ratio is not greater than said Signal-to-Mask ratio threshold value in said step (2);

(3) repeating said step (1) to step (2-1) until it is judged that said Signal-to-Mask ratio is greater than said Signal-to-Mask ratio threshold value in said step (2);

(4) incrementing said maximum scale factor band by one if it is judged that said Signal-to-Mask ratio is greater than said Signal-to-Mask ratio threshold value in said step (2);

(5) judging whether said maximum scale factor band thus incremented by one in said step (4) is less than said minimum scale factor band;

(6) incrementing said minimum scale factor band by one, replacing said maximum scale factor band with said minimum scale factor band thus incremented by one, and outputting said maximum scale factor band thus replaced to said spectral processing means if is judged that said maximum scale factor band is less than said minimum scale factor band in said step (5); and (7) outputting said maximum scale factor band to said spectral processing means if it is judged that said maximum scale factor band is not less than said minimum scale factor band in said step (5).

7. An audio signal encoding method of dividing audio signal into a plurality of audio signal components each corresponding to a scale factor band to be encoded in accordance with a predetermined psychoacoustic model, comprising the steps of:

(A) inputting said audio signal therein;

(B) judging whether said audio signal inputted in said step (A) is transient or stationary, and determining a short-length frame for said audio signal when it is judged that said audio signal is transient and a long-length frame for said audio signal when it is judged that said audio signal is stationary;

(C) performing the fast Fourier transform to said audio signal inputted in said step (A) to generate frequency information about said audio signal;

(D) inputting coded mode information;

(E) calculating Signal-to-Mask ratio information for said audio signal on the basis of said frequency information about said audio signal generated in said step (C), in accordance with said predetermined psychoacoustic model;

(F) storing initial maximum scale factor band information and Signal-to-Mask ratio threshold value information;

(G) calculating an initial maximum scale factor band for said audio signal on the basis of the result made in said step (B) and said coded mode information inputted in said step (D) with reference to said initial maximum scale factor band information and said Signal-to-Mask ratio threshold value information stored in said step (F);

(H) calculating a maximum scale factor band for said audio signal on the basis of said initial maximum scale factor band calculated in said step (G) in accordance with said Signal-to-Mask ratio information calculated in said step (E);

(I) dividing said audio signal inputted in said step (A) into a plurality of audio signal components each corresponding to a scale factor band, and performing spectral processing to said audio signal components up to an audio signal component corresponding to said maximum scale factor band calculated in said step (H), on the basis of said Signal-to-Mask ratio information calculated in said step (E) to generate audio signal data; and (J) quantizing and encoding said audio signal data generated in said step (I) to generate a coded audio signal to be outputted therethrough.

8. An audio signal encoding method as set forth in claim 7, in which said coded mode information includes bit rate information and sampling frequency information, said step (F) has the step of storing initial maximum scale factor band information having a plurality of scale factor bands in relation to the bit rate information and the sampling frequency information and Signal-to-Mask ratio threshold value information having a plurality of Signal-to-Mask ratio threshold values in relation to the bit rate information and the sampling frequency information, said step (G) has the step of calculating an initial maximum scale factor band for said audio signal on the basis of the result made in said step (B) and said coded mode information including said bit rate information and said sampling frequency information inputted in said step (D) with reference to said initial maximum scale factor band information and Signal-to-Mask ratio threshold value information stored in said step (F), and said step (H) has the step of calculating a maximum scale factor band for said audio signal on the basis of said Signal-to-Mask ratio information calculated in said step (E) and said initial maximum scale factor band calculated in said step (G).

9. An audio signal encoding method as set forth in claim 8, in which said coded mode information further includes the number of channels, said step (F) has the step of storing initial maximum scale factor band information having a plurality of scale factor bands in relation to the number of channels and Signal-to-Mask ratio threshold value information having a plurality of Signal-to-Mask ratio threshold values in relation to the number of channels, said step (G) has the step of calculating an initial maximum scale factor band for said audio signal on the basis of the result made in said step (B) and said coded mode information including the number of channels inputted in said step (D) with reference to said initial maximum scale factor band information and Signal-to-Mask ratio threshold value information stored in said step (F), and said step (H) has the step of calculating a maximum scale factor band for said audio signal on the basis of said Signal-to-Mask ratio information calculated in said step (E) and said initial maximum scale factor band calculated in said step (G).

10. An audio signal encoding method as set forth in claim 7, in which said Signal-to-Mask ratio information includes a Signal-to-Mask ratio table showing a relationship between a plurality of Signal-to-Mask ratios and scale factor bands, said step (F) has the step of storing initial maximum scale factor band information and Signal-to-Mask ratio threshold value information, said step (G) has the step of calculating an initial maximum scale factor band and a Signal-to-Mask ratio threshold value for said audio signal on the basis of the result made in said step (B) and said coded mode information inputted in said step (D) with reference to said initial maximum scale factor band information and said Signal-to-Mask ratio threshold value information stored in said step (F), and said step (H) has the step of calculating a maximum scale factor band for said audio signal on the basis of said initial maximum scale factor band and said Signal-to-Mask ratio threshold value calculated in said step (G) in accordance with said Signal-to-Mask ratio table showing a relationship between Signal-to-Mask ratios and scale factor bands included in said Signal-to-Mask ratio information calculated in said step (E) through the steps of:

(H-1) determining a Signal-to-Mask ratio corresponding to a maximum scale factor band in accordance with said Signal-to-Mask ratio table wherein the initial value of said maximum scale factor band is said initial maximum scale factor band calculated in said step (G);

(H-2) judging whether said Signal-to-Mask ratio determined in said step (H-1) is greater than said Signal-to-Mask ratio threshold value;

(H-2-1) decrementing said maximum scale factor band by one and returning to said step (H-1) if it is judged that said Signal-to-Mask ratio is not greater than said Signal-to-Mask ratio threshold value in said step (H-2);

(H-3) repeating said step (H-1) to step (H-2-1) until it is judged that said Signal-to-Mask ratio is greater than said Signal-to-Mask ratio threshold value in said step (H-2);

(H-4) incrementing said maximum scale factor band by one if it is judged that said Signal-to-Mask ratio is greater than said Signal-to-Mask ratio threshold value in said step (H-2); and (H-5) outputting said maximum scale factor band thus incremented by one in said step (H-4) to said step (I).

11. An audio signal encoding method as set forth in claim 7, in which said step (F) has the step of storing initial maximum scale factor band information and energy threshold value information, said step (G) has the step of calculating an initial maximum scale factor band and an energy threshold value for said audio signal on the basis of the result made in said step (B) and said coded mode information inputted in said step (D) with reference to said initial maximum scale factor band information and said energy threshold value information stored in said step (F), and said step (H) has the step of calculating an energy value table showing a relationship between a plurality of energy values and scale factor bands on the basis of said frequency information generated in said step (C), and calculating a maximum scale factor band for said audio signal on the basis of said initial maximum scale factor band and said energy threshold value calculated in said step (G) with reference to said energy value table showing a relationship between energy values and scale factor bands through the steps of:

(H-1) determining an energy value corresponding to a maximum scale factor band in accordance with said energy value table wherein said initial value of said maximum scale factor band is said initial maximum scale factor band calculated in said step (G);

(H-2) judging whether said energy value determined in said step (H-1) is greater than said energy threshold value;

(H-2-1) decrementing said maximum scale factor band by one and returning to said step (H-1) if it is judged that said energy value is not greater than said energy threshold value in said step (H-2);

(H-3) repeating said step (H-1) and step (H-2-1) until it is judged that said energy value is greater than said energy threshold value in said step (H-2);

(H-4) incrementing said maximum scale factor band by one if it is judged that said energy value is greater than said energy threshold value in said step (H-2), and (H-5) outputting said maximum scale factor band thus incremented by one in said step (H-4) to said step (I).

12. An audio signal encoding method as set forth in claim 7, in which said Signal-to-Mask ratio information includes a Signal-to-Mask ratio table showing a relationship between a plurality of Signal-to-Mask ratios and scale factor bands, said step (F) has the step of storing initial maximum scale factor band information, Signal-to-Mask ratio threshold value information, and minimum scale factor band information, said step (G) has the step of calculating an initial maximum scale factor band, a Signal-to-Mask ratio threshold value, and a minimum scale factor band for said audio signal on the basis of the result made in said step (B) and said coded mode information inputted in said step (D) with reference to said initial maximum scale factor band information, said Signal-to-Mask ratio threshold value information, and said minimum scale factor band information stored in said step (F), and said step (H) has the step of calculating a maximum scale factor band for said audio signal on the basis of said initial maximum scale factor band, said Signal-to-Mask ratio threshold value, and said minimum scale factor band calculated in said step (G) in accordance with said Signal-to-Mask ratio table showing a relationship between Signal-to-Mask ratio and scale factor bands included in said Signal-to-Mask ratio information calculated in said step (E) through the steps of:

(H-1) determining a Signal-to-Mask ratio corresponding to a maximum scale factor band in accordance with said Signal-to-Mask ratio table wherein the initial value of said maximum scale factor band is said initial maximum scale factor band calculated in said step (G);

(H-2) judging whether said Signal-to-Mask ratio determined in said step (H-1) is greater than said Signal-to-Mask ratio threshold value;

(H-2-1) decrementing said maximum scale factor band by one if it is judged that said Signal-to-Mask ratio is not greater than said Signal-to-Mask ratio threshold value in said step (H-2);

(H-3) repeating said step (H-1) to step (H-2-1) until it is judged that said Signal-to-Mask ratio is greater than said Signal-to-Mask ratio threshold value in said step (H-2);

(H-4) incrementing said maximum scale factor band by one if it is judged that said Signal-to-Mask ratio is greater than said Signal-to-Mask ratio threshold value in said step (H-2);

(H-5) judging whether said maximum scale factor band thus incremented by one in said step (H-4) is less than said minimum scale factor band;

(H-6) incrementing said minimum scale factor band by one, replacing said maximum scale factor band with said minimum scale factor band thus incremented by one, and outputting said maximum scale factor band thus replaced to said step (I) if is judged that said maximum scale factor band is less than said minimum scale factor band in said step (H-5); and (H-7) outputting said maximum scale factor band to said step (I) if it is judged that said maximum scale factor band is not less than said minimum scale factor band in said step (H-5).

13. An audio signal encoding computer program product comprising a computer usable storage medium having computer readable code embodied therein for dividing audio signal into a plurality of audio signal components each corresponding to a scale factor band to be encoded in accordance with a predetermined psychoacoustic model, comprising:

(A) computer readable program code for inputting said audio signal therein;

(B) computer readable program code for judging whether said audio signal inputted by said computer readable program code (A) is transient or stationary, and determining a short-length frame for said audio signal when it is judged that said audio signal is transient and a long-length frame for said audio signal when it is judged that said audio signal is stationary;

(C) computer readable program code for performing the fast Fourier transform to said audio signal inputted by said computer readable program code (A) to generate frequency information about said audio signal;

(D) computer readable program code for inputting coded mode information;

(E) computer readable program code for calculating Signal-to-Mask ratio information for said audio signal on the basis of said frequency information about said audio signal generated by said computer readable program code (C), in accordance with said predetermined psychoacoustic model;

(F) computer readable program code for storing initial maximum scale factor band information and Signal-to-Mask ratio threshold value information;

(G) computer readable program code for calculating an initial maximum scale factor band for said audio signal on the basis of the result made by said computer readable program code (B) and said coded mode information inputted by said computer readable program code (D) with reference to said initial maximum scale factor band information and said Signal-to-Mask ratio threshold value information stored by said computer readable program code (F);

(H) computer readable program code for calculating a maximum scale factor band for said audio signal on the basis of said initial maximum scale factor band calculated by said computer readable program code (G) in accordance with said Signal-to-Mask ratio information calculated by said computer readable program code (E);

(I) computer readable program code for dividing said audio signal inputted by said computer readable program code (A) into a plurality of audio signal components each corresponding to a scale factor band, and performing spectral processing to said audio signal components up to an audio signal component corresponding to said maximum scale factor band calculated by said computer readable program code (H), on the basis of said Signal-to-Mask ratio information calculated by said computer readable program code (E) to generate audio signal data; and (J) computer readable program code for quantizing and encoding said audio signal data generated by said computer readable program code (I) to generate a coded audio signal to be outputted therethrough.

14. An audio signal encoding computer program product as set forth in claim 13, in which said coded mode information includes bit rate information and sampling frequency information, said computer readable program code (F) has the computer readable program code of storing initial maximum scale factor band information having a plurality of scale factor bands in relation to the bit rate information and the sampling frequency information and Signal-to-Mask ratio threshold value information having a plurality of Signal-to-Mask ratio threshold values in relation to the bit rate information and the sampling frequency information, said computer readable program code (G) has the computer readable program code of calculating an initial maximum scale factor band for said audio signal on the basis of the result made by said computer readable program code (B) and said coded mode information including said bit rate information and said sampling frequency information inputted by said computer readable program code (D) with reference to said initial maximum scale factor band information and Signal-to-Mask ratio threshold value information stored by said computer readable program code (F), and said computer readable program code (H) has the computer readable program code of calculating a maximum scale factor band for said audio signal on the basis of said Signal-to-Mask ratio information calculated by said computer readable program code (E) and said initial maximum scale factor band calculated by said computer readable program code (G).

15. An audio signal encoding computer program product as set forth in claim 14, in which said coded mode information further includes the number of channels, said computer readable program code (F) has the computer readable program code of storing initial maximum scale factor band information having a plurality of scale factor bands in relation to the number of channels and Signal-to-Mask ratio threshold value information having a plurality of Signal-to-Mask ratio threshold values in relation to the number of channels, said computer readable program code (G) has the computer readable program code of calculating an initial maximum scale factor band for said audio signal on the basis of the result made by said computer readable program code (B) and said coded mode information including the number of channels inputted by said computer readable program code (D) with reference to said initial maximum scale factor band information and Signal-to-Mask ratio threshold value information stored by said computer readable program code (F), and said computer readable program code (H) has the computer readable program code of calculating a maximum scale factor band for said audio signal on the basis of said Signal-to-Mask ratio information calculated by said computer readable program code (E) and said initial maximum scale factor band calculated by said computer readable program code (G).

16. An audio signal encoding computer program product as set forth in claim 13, in which said Signal-to-Mask ratio information includes a Signal-to-Mask ratio table showing a relationship between a plurality of Signal-to-Mask ratios and scale factor bands, said computer readable program code (F) has the computer readable program code of storing initial maximum scale factor band information and Signal-to-Mask ratio threshold value information, said computer readable program code (G) has the computer readable program code of calculating an initial maximum scale factor band and a Signal-to-Mask ratio threshold value for said audio signal on the basis of the result made by said computer readable program code (B) and said coded mode information inputted by said computer readable program code (D) with reference to said initial maximum scale factor band information and said Signal-to-Mask ratio threshold value information stored by said computer readable program code (F), and said computer readable program code (H) has the computer readable program code of calculating a maximum scale factor band for said audio signal on the basis of said initial maximum scale factor band and said Signal-to-Mask ratio threshold value calculated by said computer readable program code (G) in accordance with said Signal-to-Mask ratio table showing a relationship between Signal-to-Mask ratios and scale factor bands included by said Signal-to-Mask ratio information calculated by said computer readable program code (E) through the computer readable program codes of:

(H-1) computer readable program code for determining a Signal-to-Mask ratio corresponding to a maximum scale factor band in accordance with said Signal-to-Mask ratio table wherein the initial value of said maximum scale factor band is said initial maximum scale factor band calculated by said computer readable program code (G);

(H-2) computer readable program code for judging whether said Signal-to-Mask ratio determined by said computer readable program code (H-1) is greater than said Signal-to-Mask ratio threshold value;

(H-2-1) decrementing said maximum scale factor band by one and returning to said computer readable program code (H-1) if it is judged that said Signal-to-Mask ratio is not greater than said Signal-to-Mask ratio threshold value by said computer readable program code (H-2);

(H-3) computer readable program code for repeating said computer readable program code (H-1) to computer readable program code (H-2-1) until it is judged that said Signal-to-Mask ratio is greater than said Signal-to-Mask ratio threshold value by said computer readable program code (H-2);

(H-4) computer readable program code for incrementing said maximum scale factor band by one if it is judged that said Signal-to-Mask ratio is greater than said Signal-to-Mask ratio threshold value by said computer readable program code (H-2); and (H-5) computer readable program code for outputting said maximum scale factor band thus incremented by one by said computer readable program code (H-4) to said computer readable program code (I).

17. An audio signal encoding computer program product as set forth in claim 13, in which said computer readable program code (F) has the computer readable program code of storing initial maximum scale factor band information and energy threshold value information, said computer readable program code (G) has the computer readable program code of calculating an initial maximum scale factor band and an energy threshold value for said audio signal on the basis of the result made by said computer readable program code (B) and said coded mode information inputted by said computer readable program code (D) with reference to said initial maximum scale factor band information and said energy threshold value information stored by said computer readable program code (F), and said computer readable program code (H) has the computer readable program code of calculating an energy value table showing a relationship between a plurality of energy values and scale factor bands on the basis of said frequency information generated by said computer readable program code (C), and calculating a maximum scale factor band for said audio signal on the basis of said initial maximum scale factor band and said energy threshold value calculated by said computer readable program code (G) with reference to said energy value table showing a relationship between energy values and scale factor bands through the computer readable program codes of:

(H-1) computer readable program code for determining an energy value corresponding to a maximum scale factor band in accordance with said energy value table whereby said initial value of said maximum scale factor band is said initial maximum scale factor band calculated by said computer readable program code (G);

(H-2) computer readable program code for judging whether said energy value determined by said computer readable program code (H-1) is greater than said energy threshold value;

(H-2-1) computer readable program code for decrementing said maximum scale factor band by one and returning to said computer readable program code (H-1) if it is judged that said energy value is not greater than said energy threshold value by said computer readable program code (H-2);

(H-3) computer readable program code for repeating said computer readable program code (H-1) and computer readable program code (H-2-1) until it is judged that said energy value is greater than said energy threshold value by said computer readable program code (H-2);

(H-4) computer readable program code for incrementing said maximum scale factor band by one if it is judged that said energy value is greater than said energy threshold value by said computer readable program code (H-2), and (H-5) computer readable program code for outputting said maximum scale factor band thus incremented by one by said computer readable program code (H-4) to said computer readable program code (I).

18. An audio signal encoding computer program product as set forth in claim 13, in which said Signal-to-Mask ratio information includes a Signal-to-Mask ratio table showing a relationship between a plurality of Signal-to-Mask ratios and scale factor bands, said computer readable program code (F) has the computer readable program code of storing initial maximum scale factor band information, Signal-to-Mask ratio threshold value information, and minimum scale factor band information, said computer readable program code (G) has the computer readable program code of calculating an initial maximum scale factor band, a Signal-to-Mask ratio threshold value, and a minimum scale factor band for said audio signal on the basis of the result made by said computer readable program code (B) and said coded mode information inputted by said computer readable program code (D) with reference to said initial maximum scale factor band information, said Signal-to-Mask ratio threshold value information, and said minimum scale factor band information stored by said computer readable program code (F), and said computer readable program code (H) has the computer readable program code of calculating a maximum scale factor band for said audio signal on the basis of said initial maximum scale factor band, said Signal-to-Mask ratio threshold value, and said minimum scale factor band calculated by said computer readable program code (G) in accordance with said Signal-to-Mask ratio table showing a relationship between Signal-to-Mask ratio and scale factor bands included by said Signal-to-Mask ratio information calculated by said computer readable program code (E) through the computer readable program codes of:

(H-1) computer readable program code for determining a Signal-to-Mask ratio corresponding to a maximum scale factor band in accordance with said Signal-to-Mask ratio table wherein the initial value of said maximum scale factor band is said initial maximum scale factor band calculated by said computer readable program code (G);

(H-2) computer readable program code for judging whether said Signal-to-Mask ratio determined by said computer readable program code (H-1) is greater than said Signal-to-Mask ratio threshold value;

(H-2-1) computer readable program code for decrementing said maximum scale factor band by one if it is judged that said Signal-to-Mask ratio is not greater than said Signal-to-Mask ratio threshold value by said computer readable program code (H-2);

(H-3) computer readable program code for repeating said computer readable program code (H-1) to computer readable program code (H-2-1) until it is judged that said Signal-to-Mask ratio is greater than said Signal-to-Mask ratio threshold value by said computer readable program code (H-2);

(H-4) computer readable program code for incrementing said maximum scale factor band by one if it is judged that said Signal-to-Mask ratio is greater than said Signal-to-Mask ratio threshold value by said computer readable program code (H-2);

(H-5) computer readable program code for judging whether said maximum scale factor band thus incremented by one by said computer readable program code (H-4) is less than said minimum scale factor band;

(H-6) computer readable program code for incrementing said minimum scale factor band by one, replacing said maximum scale factor band with said minimum scale factor band thus incremented by one, and outputting said maximum scale factor band thus replaced to said computer readable program code (I) if is judged that said maximum scale factor band is less than said minimum scale factor band by said computer readable program code (H-5); and (H-7) computer readable program code for outputting said maximum scale factor band to said computer readable program code (I) if it is judged that said maximum scale factor band is not less than said minimum scale factor band by said computer readable program code (H-5).

* * * * *